United States Patent [19]
Douceur

[11] Patent Number: 6,067,547
[45] Date of Patent: May 23, 2000

[54] HASH TABLE EXPANSION AND CONTRACTION FOR USE WITH INTERNAL SEARCHING

[75] Inventor: John R. Douceur, Bellevue, Wash.

[73] Assignee: Microsoft Corporation, Redmond, Wash.

[21] Appl. No.: 08/911,105

[22] Filed: Aug. 12, 1997

[51] Int. Cl.[7] .................................................. G06F 17/30
[52] U.S. Cl. ........................................ 707/100; 707/102
[58] Field of Search ................................. 707/1, 4, 100, 707/102; 395/445; 370/60

[56] References Cited

U.S. PATENT DOCUMENTS

| | | | |
|---|---|---|---|
| 5,414,704 | 5/1995 | Spinney | 370/60 |
| 5,687,361 | 11/1997 | Sarkar | 707/1 |
| 5,706,462 | 1/1998 | Matousek | 395/445 |
| 5,734,886 | 3/1998 | Grosse et al. | 707/4 |

OTHER PUBLICATIONS

Litwin, W., "Linear Hasing: A New Tool For File And Table Addressing," Very Large Data Bases. Proceedings of the Sixth–International Conference, Oct. 1980, pp. 212–223.

*Primary Examiner*—Thomas G. Black
*Assistant Examiner*—Frantz Coby
*Attorney, Agent, or Firm*—Lee & Hayes, PLLC

[57] ABSTRACT

Hash tables are used to index an internal database—one that resides in primary memory. The hash tables are segmented into a sequence of segments that increase geometrically in size. To expand a table, an additional segment is allocated which is twice as large as the previously allocated segment. This most recently allocated segment is referred to as an expansion segment, while the previously existing segments are referred to as base segments. As records are added, entries from the base segments are gradually split, and some of the records referenced by these entries are assigned to new entries in the expansion segment. This distributes address recalculations over time, while also using memory quite efficiently.

43 Claims, 14 Drawing Sheets

HASH TABLE EXPANSION AND CONTRACTION FOR USE WITH INTERNAL SEARCHING

TECHNICAL FIELD

This invention relates to hash tables used in conjunction with internal databases, and to methods of dynamically expanding and contracting internal hash tables without causing significant variance in record insertion times.

BACKGROUND

Database Hash Tables

Computer programs commonly require a method of storing data records in such a manner that they can be quickly retrieved. For example, an address book typically has data records that correspond respectively to different persons. Each data record includes fields corresponding, for example, to a person's name, address, telephone number, and other information. Each data record is typically stored as an integral entity in whatever memory is being utilized. In this example, the name field in each data record is designated as a key, so that when a name is presented to the storage system, the data record can be quickly retrieved based on the key.

Many data structures exist for increasing the speed of storing and retrieving information based on keys. Such data structures allow a computer program to locate desired data records without requiring a search through all available records, somewhat like looking up a word in a dictionary without having to perform a linear search from the beginning of the dictionary. This is particularly important in databases containing large number of records.

A hash table is an example of a data structure designed to increase the speed and efficiency of database searching. A hash table is a sequence of entries, each of which has a unique address within the table. Each entry has a pointer that references or points to one or more records. The data records referenced by a particular entry are said to be assigned to that entry. The particular entry to which a record is assigned is determined by the record's key. More specifically, an address generation function is used to convert the record's key to an address of a hash table entry, and the record is assigned to this entry.

In general, it is not known ahead of time what key values will arise in conjunction with data records. As a result, it is possible that a particular address generation function will produce an identical address for two distinct key values, and that two records with different keys will be assigned to the same hash table entry. This situation is known as a conflict, and it must be handled by a conflict resolution method.

Depending upon their general strategies for conflict resolution, hash tables are divided into two classes: closed and open. In a closed hash table, each data record is assigned to a particular hash table entry, and conflicts are handled by finding a different entry in the table for one of the conflicting records. In an open hash table, each record is stored in a data structure that is pointed to by a hash table entry, and this data structure is generally capable of containing multiple records; a common such data structure is a linked list.

A classic open hash table 10 with linked lists is illustrated in FIG. 1. In the example of FIG. 1, eight records (referenced by numeral 11) have been assigned to entries (referenced generally by numeral 12) of hash table 10. In the following discussion, entries will be referenced by their addresses: entry 0, entry 1, and so on.

The key values of the records are "A", "B", "F", "J", "L", "P", "V", and "X". Key value "A" generates address 0, so the record with this key is pointed to by a pointer from entry 0 of the hash table. Key values "P" and "X" both generate address 1, so their corresponding records are stored as a linked list, one element of which is pointed to by entry 1 of the hash table. None of the records have key values that generate address 2, so entry 2 of the hash table does not point to any records.

When the hash table is to be searched for a target record that has a particular key, first the key value is turned into an address by means of an address generation function. The hash table in FIG. 1 has 8 entries, so the address produced by the function must be in the range 0 to 7. As an example of finding a particular record using the hash table, assume that the address generation function produces an address of 5 for key value "J". Entry 5 points to a record. However, this record has a key value of "B" and is not the desired record. Accordingly, a pointer associated with the "B" record is examined to find the next record in the linked list. This next record, having a key value of "F", is not the desired record, so the associated pointer is used to find the next record. Finally, this record has a key value of "J", indicating that the correct record has been found.

As another example, consider searching for the data record associated with key value "D". Suppose that the address generation function produces an address of 1 for this key. Entry 1 in the hash table points to a record; however, the record's key value "P" does not match the search key. Accordingly, the linked-list pointer maintained with this record is examined and used to find the next data record that has been assigned to entry 1. The next record has a key value of "X", which again does not match the search key. In this case, the pointer associated with the record is null, indicating the end of the linked list. Since no match has been found, the search concludes with the result that the desired record does not exist in the database.

Internal and External Hash Tables

There are two broad categories of database search applications and two corresponding classes of hash tables: internal and external. In internal searching, an entire database resides in primary storage such as electronic, addressable memory (usually some type of RAM). In external searching, the vast majority of the data reside in slower secondary storage such as a rotatable memory media (usually a magnetic-based hard disk). However, the data must be brought into primary memory before it can be read.

The difference between internal and external searching is very important, because the assumptions on which the associated search algorithms rely are radically different in each case. For external searches, the cost of an insertion, removal, or retrieval operation is dominated by the cost of the access to the secondary storage media. Therefore, the primary design goal of an external search system is to minimize the number of secondary storage accesses, even if it is at the expense of primary storage access or computational effort, since the latter often have a negligible effect on the total search time relative to the former. For an internal search, the trade-off is not so clear cut. Both primary storage access and computational effort will contribute significantly toward search time, so neither one can be neglected when evaluating performance.

Table Resizing

When using internal searching with linked data record lists, the average time required to perform a search is proportional simply to the mean length of the linked record lists. Therefore, it is desirable to keep the linked record lists short. Since the mean list length is equal to the ratio of stored data records to the number of hash table entries, a large record storage capacity requires a proportionally large hash table. This can be problematic if the number of records is not known in advance, because once a table size is selected, it might turn out to be either oversized for a small number of records (thus wasting storage space) or undersized for a large number of records (thus resulting in lengthy linked lists and long search times).

This problem can be overcome by resizing the hash table as records are inserted. However, the prior art techniques for resizing an internal hash table suffer from a problem: the resizing occurs sporadically, with a proportional increase in the time required to resize as the table size increases. For some applications, all that matters is aggregate performance over a large number of operations. Since the prior art resizing techniques require asymptotically mean constant times, they are generally acceptable for such applications. For some applications, however, it is not acceptable to consume an unbounded amount of time for a single operation, even if it is a relatively infrequent occurrence. For these applications, it is necessary to spread the effort of resizing evenly over all insertion or removal operations. Prior to the present invention, no such technique has been available to do so in an efficient manner.

Address Generation and Record List Searching

This section and the remainder of the "Background" portion of this document focus on different prior art techniques relating to hash tables and hash table resizing. In addition, the terminology developed here will be used throughout the remainder of the document.

In the example of FIG. 1, an address-generation function is required to transform a key value into an address between 0 and 7. This can be performed in a single step, but more commonly it is performed in three sequential steps. First, the key value is digested from its full length into a fixed-sized value (if the key values are small enough, this step is unnecessary). This digestion is typically performed by breaking the key into fields and combining the fields by some process such as addition or exclusive-oring, often in conjunction with multiplying or rotating each field by some fixed value. Second, the digested value is scrambled so that any regularity that may be found in the key values will not yield regularity in the resulting values. One well-known way of accomplishing this is by multiplying the digested value by the "golden ratio," $(\sqrt{5}-1)/2$, and taking the fractional part of the result. These two steps are together referred to as a hash function, and the result is called a hash value. In the third step, the hash value is reduced to an address in the valid range by taking the value modulo the size of the table. If the table size is a power of two, this is equivalent to taking the least significant bits of the hash value. For example, if the table size is 8, the 3 ($\log_2 8$) least significant bits of the hash value can be used to form the address.

Address generation must be performed for both insertion and retrieval operations. For retrieval, the next step is to scan through the linked list pointed to by the addressed location in the hash table. The key in each record in the list must be examined to determine whether it matches the search key. If no records have matching keys, then the search is unsuccessful.

On average, each successful search will examine a number of records equal to half of the mean list length, but each unsuccessful search will examine a number of records equal to the entire mean list length. If unsuccessful searches are expected to be common, their performance can be improved by storing the records in each list in sorted order. If the records in each list are sorted by their keys, a search through the list can terminate as soon as a record is found whose key value is greater than the search key value, since if a record containing the search key were present, it would occur in the list prior to the record with the greater key value.

For example, note that the records in FIG. 1 are organized in linked lists, in sorted order. Consider again the example search discussed above for a record with a key value of "D". The address generation function produces an address of 1 for this key. Entry 1 points to a record having key value "P", which is greater than the value of the search key. If a record with key value "D" were present in the list, it would precede the record with key value "P". Thus, it can be concluded that no record with key value "D" is stored in the hash table—the search can be terminated without scanning through the entire linked list.

A further performance improvement can be made by storing a signature value of the key along with each record. One way to calculate this signature is to use some bits of the hash value calculated for the key. Obviously, these bits must be at different positions than those for the address itself, since all records in the same linked list have the same address. When the search is performed, the signature values are compared rather than the entire search key. Since the signature values are often significantly smaller than the key values, comparison times can be reduced by this technique. Only if the signature values match do the actual key values need to be compared. If signature values are employed, then the records in each linked list can be sorted according to the signatures instead of the key values. This optimization can improve the search times for both unsuccessful and successful searches.

The insertion operation proceeds similarly to the retrieval operation, except that if no match is found in the appropriate linked list, then the new record is inserted into that list. If the list is to be maintained in sorted order, then the new record is inserted just before the first entry that is has a greater key value or signature than that of the new record. If no such record is present in the list, then the new record is inserted at the end of the list.

Geometric Expansion and Contraction

As additional records are assigned to hash table entries, the ratio of records to table entries increases. The mean list length also increases, leading to an increase in the time to perform an insertion or retrieval operation. To counter this effect, the table size can be increased. However, it is not generally possible to allocate additional addressable memory immediately following an area of used memory, since that following memory area may be in use for storing other data. For convenient addressing of a hash table, however, it is useful for the hash table entries to be located contiguously in memory. Therefore, increasing the hash table size actually requires allocating a separate, larger area of memory for a new hash table; copying the entries of the smaller hash table into the corresponding entries of the new, larger hash table; and deallocating the memory originally used by the smaller table. This is an expensive sequence of operations.

Furthermore, increasing the hash table size means increasing the address range, which in turn means changing the address generation function (since the function that had been in use produces addresses strictly in the smaller address range). Changing the address generation function in turn means that key values no longer yield the same addresses that they did previously, so addresses for all of the records in the database must be recomputed, and the records must potentially be assigned to new entries. This is not merely a matter of shifting the locations of the pointers in the hash table, because there is no guarantee that those records that were in the same list in the smaller table (by virtue of their having the same address) will be in the same list in the larger table. In fact, this would not be a desirable feature, since if the lists were unchanged then the length of the lists would be unchanged, and there would be little point to increasing the size of the table. Thus, the address for each record must be recalculated, and each record must be individually reassigned to an appropriate entry in the larger hash table.

One method for reducing the burden of this reassignment is to store the hash value of the record's key along with each record. This value (or a portion thereof) can be used as a signature in order to improve the search performance, as described above. The hash value can also be used to speed up the recalculation of the addresses, since only the final step of the address calculation, reducing the hash value modulo the size of the table, need be performed.

An analogous procedure to the above can be employed for reducing the table size as records are removed, thus freeing memory for use by other applications. A smaller area of memory is allocated; the address generation function is changed to produce addresses within this smaller range; the address for each record is recalculated according to this new function; and the records are reassigned into the smaller hash table; and the memory for the larger hash table is deallocated.

If the size of the table is increased or decreased by a multiplicative constant, then the table size will grow and shrink geometrically. Commonly, the multiplicative constant is chosen to be two, so the table size is doubled by each size increase and halved by each size decrease. Growing geometrically in this manner has the very desirable property that the mean insertion time is asymptotically constant. To understand why this is so, consider an example in which the target ratio of stored records to hash table locations is unity. Consider a scenario in which the current table size is 8 and the current number of stored records is 7. When record number 8 is inserted, the table size is increased from 8 to 16, requiring address recalculation and reassignment of 8 records. The subsequent insertions of records 9 through 15 require no table resizing, so the average cost of inserting each of the 8 records numbered 8 through 15 is one address recalculation and one reassignment. Similarly, when record number 16 is inserted, the table size is increased from 16 to 32, requiring address recalculation and reassignment of 16 records. The subsequent insertions of records 17 through 31 require no table resizing, so the average cost of inserting each of the 16 records numbered 16 through 31 is one address recalculation and one reassignment.

The disadvantage of this technique is that the time for the actual resizing grows linearly with the table size—even though the mean value of insertion time is asymptotically constant over all insertions. As an extreme example, if the table grew to one million records, then the next insertion (assuming that it triggers resizing) would require one million address recalculation and reassignment operations. Although it is true that the subsequent million insertions would require no resizing operations, the one very long insertion time would be unacceptable for some applications.

Linear Hashing

In the realm of external hashing, there is a prior art technique that distributes most of the effort of resizing evenly among insertion operations. This even distribution of resizing effort is actually an incidental property of the algorithm, the primary purpose of which is to allow the file in which the data is stored to grow and shrink incrementally.

In external hashing, the data records reside in secondary storage, which is very slow to access relative to primary storage. The data records are therefore not stored in linked lists, since scanning a linked list requires one access per entry in the list. Typically, there is a minimum practical read size from secondary storage, so the external hash table allocates units of storage in this minimum size, and these storage units are known as buckets. Each bucket can store several records, but the cost of scanning through the bucket to find the record of interest is generally considered to be trivial in comparison to the cost of reading the bucket from is secondary storage into primary storage. FIG. 2 illustrates an external hash table 15 with bucket 16 sized large enough to store four records.

The hash table resides in primary storage. Each hash table entry points to a bucket 16 in secondary storage. When a search is performed, the address is computed using a conventional address generation function, the bucket by the addressed hash table entry is read from secondary storage, and the contents of the bucket are scanned for the search key. If there is insufficient room in a bucket to hold all of the records assigned to a particular table entry, then some of the records must be stored in a so-called overflow bucket, which is linked to the primary bucket. In FIG. 2, the bucket containing the record with key value "X" is an overflow bucket. Obviously, accessing the overflow bucket requires an additional read from secondary storage, so it is desirable to minimize the number of overflow buckets. This is an analogous goal to that of minimizing the mean size of the linked lists in an internal hash table. This goal can be accomplished by increasing the number of hash table entries and corresponding primary buckets as the number of stored records is increased, in order to maintain a target ratio of stored records to primary buckets. In order to avoid wasting secondary storage space, the number of buckets should be increased in a incremental fashion, and the cost of this increase should be kept minimal, meaning that it should be performed with a minimum number of accesses to secondary storage. This can be accomplished with the mechanism of linear hashing.

Linear hashing begins by defining an expansion as a doubling of the number of primary buckets in the file. Each expansion is divided into a sequence of splits, where the number of splits per expansion is equal to the number of primary buckets in the file at the beginning of the expansion phase. If FIG. 2 shows the state of the hash table at the beginning of an expansion, then there will be four splits during the expansion of the file from four primary buckets to eight primary buckets, after which a new expansion begins. Eight splits will occur during the next expansion.

For each expansion, two address-generation functions are required. A first address generation function produces a value within the smaller address range of original hash table, and a second address generation function produces a value within a larger address range required for an expanded hash table that references the old buckets as well as the new buckets. The second address generation function must produce, for each key value, either an address that is the same as that produced by the first address generation function or an address that is equal to the first address generation function's address plus the size of the hash table at the beginning of the expansion. For example, in FIG. 2, key value "A" is at address 0, so that must be the address produced by the first address generation function. The second address generation function must produce an address of either 0 or 4 for key value "A". Similarly, key value "B" is at address 1, produced by the first address generation function. So the second address generation function must produce an address of either 1 or 5 for key value "B". One easy method to generate these two functions is to take an appropriate number of least significant bits from the hash value for the key. The first function uses x least-significant bits, and the second function uses x+1 least-significant bits. This satisfies the required property.

Given these two address generation functions, a split is effected first by adding a new primary bucket and corresponding hash table entry and by incrementing a value, called the extension value, that keeps track of the number of splits that have occurred in the present expansion. Then, the records in one of the bucket lists are divided between their current address and the address of the newly allocated bucket. For example, suppose that in FIG. 2 a record with key value "C" is inserted, and suppose that this key value yields address 2 according to the first address function. The new record is added to the bucket pointed to by entry 2 of the hash table. This insertion increases the ratio of stored records to primary buckets beyond the target ratio (which is two in this example), so the number of primary buckets is increased by one, and a new primary bucket is added with address 4. Then, the records at address 0 are split between address 0 and address 4, according to the address produced by the second address generation function using the records' key values. Assuming that the second address generation function produces an address of 0 for key value "A" and an address of 4 for key value "V", the resulting partially expanded hash table is illustrated in FIG. 3.

To perform a search in a partially expanded hash table such as that shown in FIG. 3, a first address is generated from the search key using the first address generation function and compared to the extension value. If the first address is not less than the extension value, the first address is used as the address for the lookup. If the first address is less than the extension value, then a second address is generated from the search key using the second address generation function, and the second address is used as the address for the lookup. For the example hash table in FIG. 3, if the search key yields a first address of 0 (which is less than 1, the extension value), then the second address is generated. The second address will be either 0 or 4. Otherwise, the first address (equal to 1, 2, or 3) will be used.

Similarly, insertion into the hash table requires first the generation of the first address using the first address generation function, and then possibly the generation of the second address. Suppose that a record with key "R" is inserted into the hash table of FIG. 3, and suppose that it generates a first address of 3. Since 3 is not less than 1 (the extension value), the new record is assigned to entry 3 of the hash table. Then suppose that another record with key "H" is inserted, and suppose that its first address is 0. Since 0 is less than 1, the second address is then generated, which will be either 0 or 4. Suppose that the second address is 4, so the new record is assigned at entry 4 of the hash table. This insertion increases the ratio of stored records to primary buckets beyond the target ratio of two, so the number of primary buckets is increased by one, and a new primary bucket is added and assigned to a new entry 5 of the hash table. Then, the records at address 1 are split between address 1 and address 5, according to the address produced by the second address generation function. Assuming that the second address generation function produces an address of 1 for key values "P" and "X" and an address of 5 for key values "B", "F", and "J", the resulting hash table is illustrated in FIG. 4.

This splitting continues two more times, until the table contains 8 addresses and 8 primary buckets, at which point the expansion is complete and a new expansion from 8 to 16 can begin.

The table can also shrink by an analogous process. The shrinking proceeds through a series of contractions, each of which is divided into a sequence of merges. Two addresses are merged or combined into a single address by merging the records from both addresses into the bucket list pointed to by the first of the two addresses. In order to reduce chatter from alternating splits and combines in response to alternating insertions and removals, it is desirable to add some hysteresis to the control function that determines when to resize the database.

In either case, the hash table grows and contracts along with the number of primary buckets. Since the hash table is maintained in primary storage, however, the cost of increasing its size is considered to be negligible in comparison to the cost of the accesses to secondary storage.

Although linear hashing can be adapted to internal hashing, doing so results in a characteristic that is unacceptable for many applications. In particular, linear hashing effectively requires the allocation of a new hash table for every split, because it is not generally possible to allocate an additional entry at the end of an existing hash table. Rather, new memory must be allocated; the old hash table must be copied to the new memory; and the memory previously occupied by the hash table must be deallocated. The time consumed in memory allocation will be relatively significant (even though it is insignificant in external search systems, relative to access times for secondary storage). If a hash table is resized in this manner at every split, then the mean insertion time will grow in proportion to the table size. This is unacceptable in many applications.

Thus, a database developer is faced with two primary options when designing an internal search mechanism: geometric expansion and linear hashing. Both of these options have disadvantages. Geometric expansion provides a constant mean insertion time, but occasionally requires very costly memory allocation and reassignment steps. Linear hashing distributes the reassignment steps more evenly, but results in linearly increasing mean insertion times.

SUMMARY

In accordance with one aspect of the invention, geometric expansion and contraction are used to resize hash tables. However, the invention avoids copying all of the entries from an old table to a new table when the new table is created. Rather, both tables exist simultaneously, and entries are split gradually, over time, as new records are added to the database. This distributes address recalculations over time, while maintaining a mean insertion time that is constant.

In accordance with another aspect of the invention, a hash table is segmented into a sequence of segments that increase geometrically in size. To expand the table, an additional segment is allocated and linked to the end of the sequence. This most recently allocated segment is referred to as an expansion segment, and is twice as large as the previously allocated segment. The previously existing segments are referred to as base segments. As records are added, entries from the base segments are gradually split: some of the records referenced by these entries are assigned to new entries in the expansion segment. This distributes address recalculations over time, while also using memory more efficiently.

A further aspect of the invention involves sorting the records by their hash values and storing them in linked lists in their sorted orders, along with their hash values. Addresses are calculated from the hash values by using the most significant bits rather than the least significant bits. This allows efficient searching through the linked list of segments, and also allows efficient reassignment of data records.

DETAILED DESCRIPTION

Partial Geometric Expansion

Figure 1:
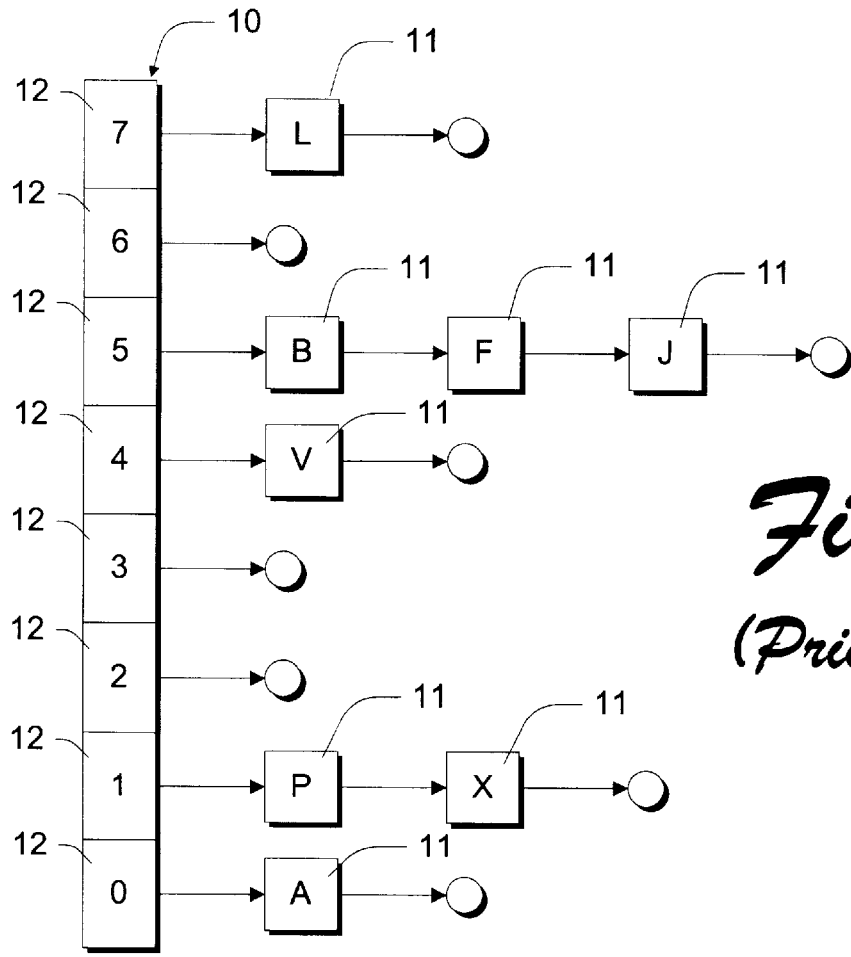
FIG. 1 illustrates a prior art internal hash table used in conjunction with linked data records.
Figure 2:
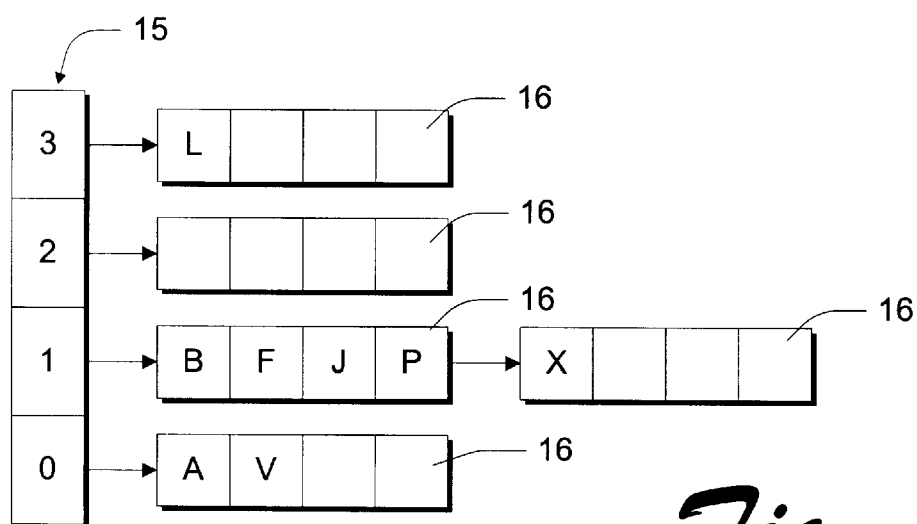
FIG. 2 illustrates a prior art external hash table and associated data buckets.
Figure 3:
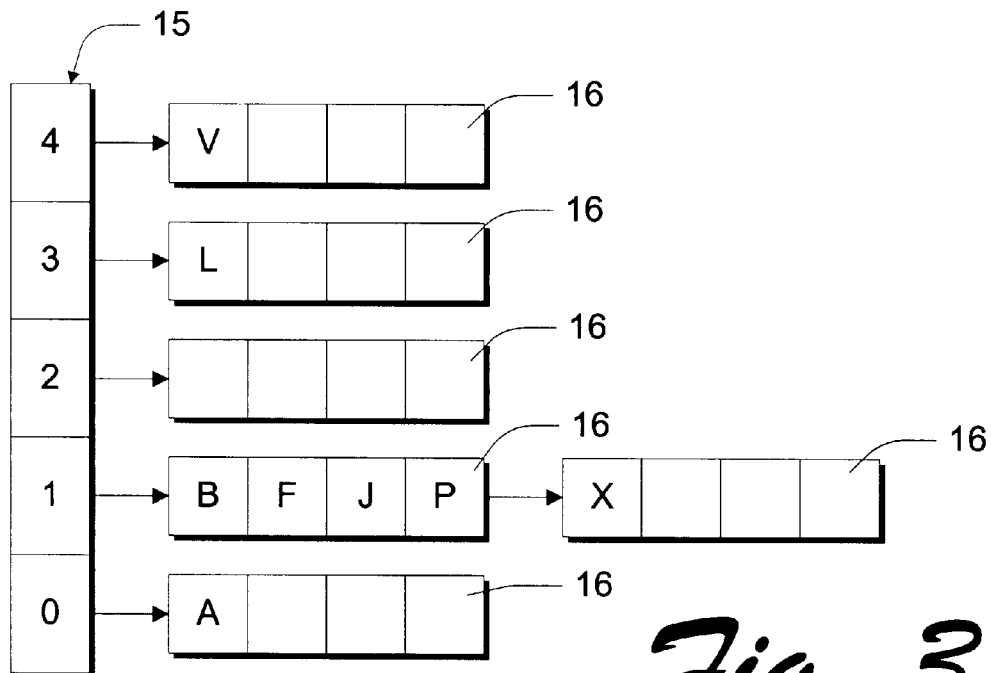
FIGS. 3 and 4 illustrate linear hashing as performed in a prior art external search system.
Figure 4:
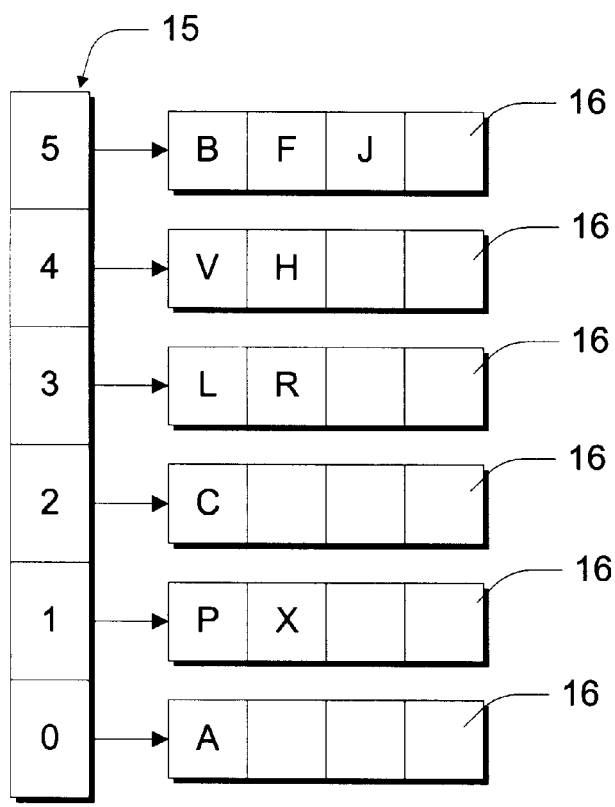
Figure 5:
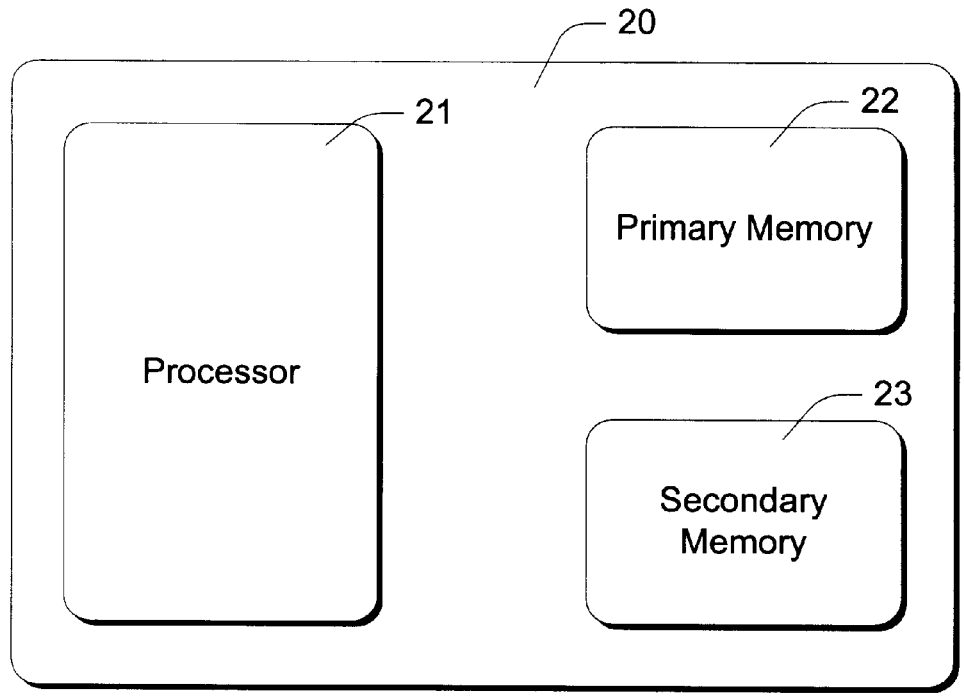
FIG. 5 illustrates a computer system as used in conjunction with the invention.

FIG. 5 shows a computer system 20 in simplified block form. Computer system 20 in the described embodiment of the invention is a personal computer such as a desktop, portable, laptop, or palmtop computer. It has a processor 21 one or more types of computer-readable storage media, which include primary memory 22, and secondary memory 23. Typically, the primary memory comprises RAM, whereas the secondary memory comprises a slower medium, such as magnetic or optical storage. An operating system (not shown) such as a Microsoft Windows operating system executes from primary memory 22 and secondary memory 23. The operating system comprises instructions that are executable by processor 21 to perform various functions, possibly including the detailed steps described below relating to the utilization and maintenance of a plurality of data records and a hash table for use in accessing the data records. Alternatively, these steps may be implemented in instructions that comprise one or more application programs, rather than the operating system. In the described embodiment, the hash table is an internal hash table, and is therefore used to reference data records that are stored entirely in primary memory 22 rather than in secondary memory 23. The hash table itself is also stored completely within primary memory 22.

As suggested above, it is desired to implement an internal hash table that can be expanded and contracted in such a way that the mean record insertion time remains constant, and also so that there is a relatively small variance in the insertion times. The prior art techniques described above are not capable of accomplishing this.

Figure 6:
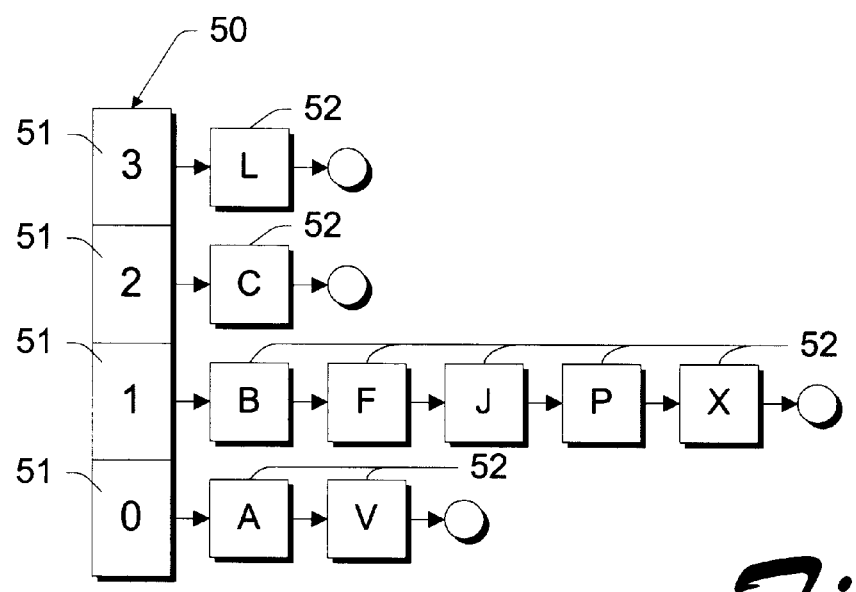
FIGS. 6 and 7 illustrate partial geometric expansion of an internal hash table in accordance with the invention.

Referring to FIG. 6, an open hash table 50 is allocated and initialized in a conventional structure. The hash table has a plurality of addressed entries 51. A plurality of data records 52 are assigned to respective entries of the hash table in accordance with a first address generation function, again using conventional address generation techniques. In the example, hash table 50 has four entries 51 with corresponding addresses 0 through 3. Each entry stores a pointer to the first record in a linked list of data records 52. A pointer to the next record in the list is stored with each record. The last record in each list has a null pointer.

A utilization value is maintained, which is simply the ratio of the count of data records to the count of hash table entries currently in use. Hash table expansion and entry splitting is performed in response to the utilization value, in order to maintain a target utilization value. In the example of FIG. 6, there are nine data records and four table entries, yielding a utilization value of slightly over two. Assume in the example that two is the target utilization value.

Figure 7:
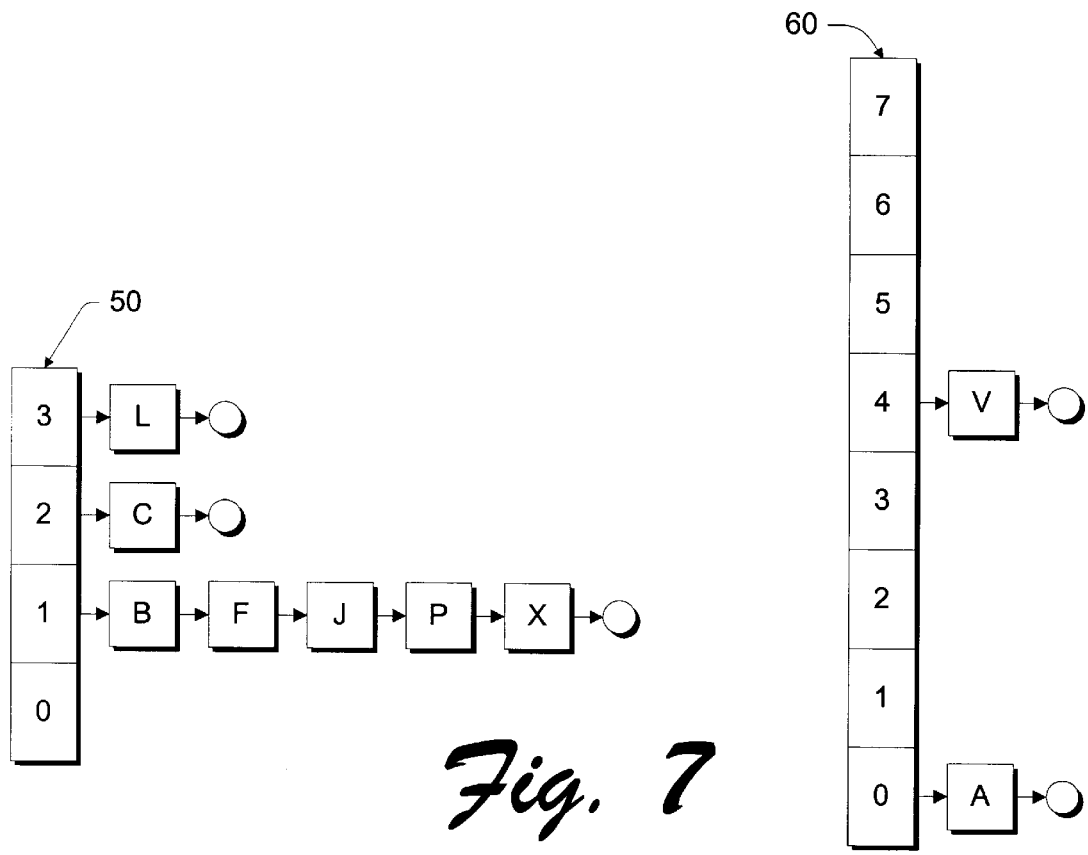

Adding records and exceeding the targeted utilization value results in repeated expansions and splits, with a plurality of splits occurring between expansions so that potentially less than all of the entries of the existing hash table are split at any given time. At the beginning of an expansion, an expanded internal hash table is allocated apart from and in addition to the existing hash table. Such an expanded hash table is shown in FIG. 7, referenced by numeral 60. The expanded hash table has entries corresponding to the entries of the existing hash table and a plurality of additional entries. When it is time for the next expansion, the "existing" hash table is deallocated, the expanded internal hash table becomes the current "existing" hash table, and another expanded hash table is allocated. Each newly-allocated, expanded table is geometrically larger than the previously allocated expanded table. More specifically, each expanded hash table has twice as many entries as the current existing hash table.

FIG. 7 shows existing hash table 50 and expanded hash table 60 after an expansion and a single split. Expanded table 60 has twice as many entries as existing hash table 50, having entries with addresses 0 through 7. Even though an entirely new hash table is allocated, pointers from the entries of the existing hash table are not copied immediately to the entries of the expanded hash table. Rather, this technique involves gradually splitting and copying the entries of the existing hash table between entries of the expanded hash table in accordance with a second, changed address generation function. Entries are copied only as they are split. The splitting step repeats as required to maintain the desired utilization value, until all entries of the existing hash table have been split. In this example, another split occurs every time the utilization value exceeds two. When all entries from the existing hash table have been split, another expansion is initiated, resulting in the allocation of a yet larger hash table. The denominator of the utilization value includes all non-split entries of existing table 50, and any entries from expanded table 60 which into which existing entries have been split.

To split a particular entry in the existing hash table, new addresses are generated for each of the data records assigned to the entry, using the key values of the data records and the second address generation function. The second address generation function produces, for each key value, either an address that is the same as that produced by the first address generation function or an address that is equal to the first address generation function's address plus the number of entries in the existing hash table. This is most simply accomplished by using the additional next-most significant bit of the key value's hash value for the key value's address.

In the example, a first split is performed by splitting entry 0 of the existing hash table 50 between entries 0 and 4 of the expanded hash table. Assuming that the second address generation function produces an address of 0 for key value "A" and an address of 4 for key value "V", the resulting hash table is illustrated in FIG. 7. The split increases the number of utilized hash table entries from four to five. The utilization value thus equals 9/5 after the split, which is less than the target value of two. No further split is needed until the utilization value reaches 11/5.

When identifying or locating a hash table entry corresponding to a particular data record (for either insertion or retrieval), the first address generation function is used to find an entry in the existing hash table if the resulting entry has not yet been split between entries of the expanded hash table. If this entry has indeed been split, the second address generation function is used to find an entry in the expanded hash table corresponding to the data record.

More specifically, an extension value is maintained to easily determine which entries have had their data records split. The extension value is equal to the address of the next entry to be split. In the example of FIG. 7, the extension value is equal to 1, since entry 1 is the next entry to be split. To perform a search in a partially expanded set of hash tables as illustrated in FIG. 7, using an extension value, a first address is generated from the search key with the first address generation function and compared to the extension value. If the first address is equal to or greater than the extension value, the first address is used as an index into the existing hash table. If the first address is less than the extension value, then a second address is generated from the search key using the second address generation function, and the second address is used to index an entry in the expanded hash table. In FIG. 7, if the search key yields a first address of 0 (which is less than 1, the extension value), then the second address is generated, which will yield an address of either 0 or 4 for indexing into the expanded hash table. Otherwise, the first address (equal to 1, 2, or 3) will be used to index into the existing hash table.

This technique is a definite improvement over the prior art, since it distributes the work of recalculating addresses. However, it has a disadvantage relating to memory utilization. Specifically, at the beginning of an expansion only one third of the memory allocated for hash tables is in use. At the end of the expansion (after nearly all splits have been performed), only two thirds of the memory is actually in use. Thus, the storage efficiency fluctuates between 1/3 and 2/3, which is not very efficient.

This inefficiency is compounded by the need to reduce the table size as records are removed. If a table has eight locations, all of which are in use, then the next size increase requires allocating a table of size 16 and performing one split. On the other hand, if the next resizing operation is a size decrease, then this requires allocating a table of size 4 and performing one merge. In order to reduce chatter from alternating allocations and deallocations of larger and smaller tables, in response to alternating splits and merges, it is desirable to add some hysteresis to the control function that determines when to allocate and deallocate memory. This hysteresis implies that there will often be a larger or a smaller hash table in addition to the two that are currently in use, further decreasing storage efficiency.

Hash Table Segmentation

The present invention includes a technique for improving the memory efficiency while still distributing address recalculations and memory allocations over time. In accordance with this aspect of the invention, the hash table is divided into segments of geometrically increasing size. A pointer is associated with each segment. The pointer associated with a particular segment links that segment to the previous or next smaller hash table segment. The system maintains a pointer to the largest segment.

Individual segments are then allocated and deallocated to expand and contract the combined hash table. Partial expansion is used to distribute address recalculations over time.

Figure 8:
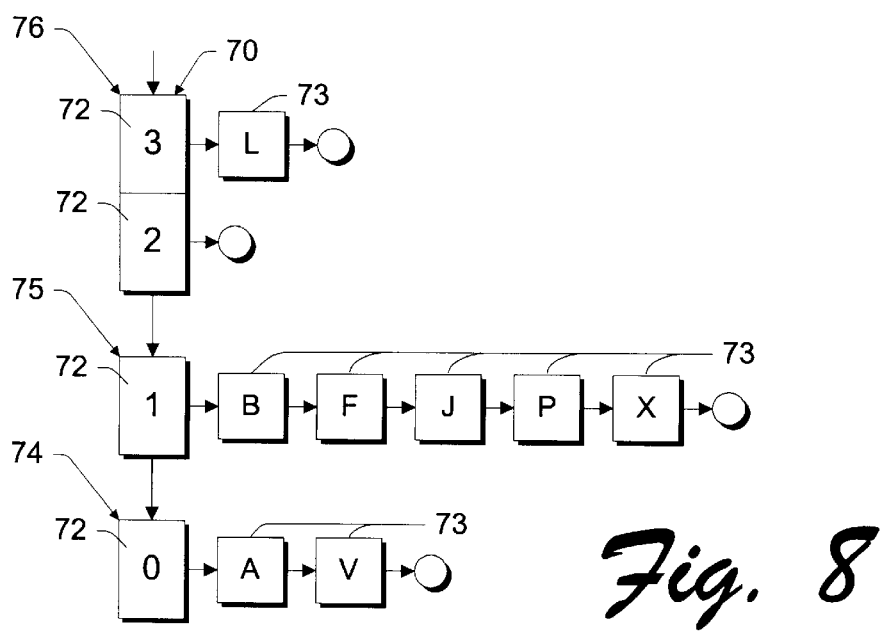
FIG. 8 illustrates a segmented hash table in accordance with the invention.

FIG. 8 shows such an internal hash table, generally referenced by numeral 70. Hash table 70 comprises a plurality of hash table segments 74, 75, and 76, having increasing sizes. Each hash table segment is positioned in its own contiguous portion of dynamically allocated addressable primary memory (usually RAM). The hash table segments have addressable entries 72 that reference data records 73 in addressable primary memory (again, usually RAM). The data records are arranged in primary memory as linked lists; a pointer is associated with each data record, linking that data record to the next data record in the list. The last data record in the list has a null pointer.

More specifically, the hash table comprises an ordered sequence of hash table segments, wherein the hash table segments increase geometrically in size in the ordered sequence. In the example, the first segment is segment 74, the next is segment 75, and the last is segment 76. Except for the first and second segments, each segment is twice as large as the previously allocated segment. New hash table segments are allocated at the end of the ordered sequence to increase the size of the hash table. The pointer associated with each segment is a backward link that references the previous and next smaller segment in the sequence.

Expansions and splits occur in response to a utilization value using a scheme that is similar to that described above. At the beginning of an expansion, however, a new hash table segment is allocated and linked to the end of the existing sequence of hash segments. For purposes of discussion, the most recently added segment is referred to as an expansion segment, while the preceding or previously allocated segments are referred to as base segments. Overall, the process comprises allocating and linking an expansion segment, gradually splitting individual base segment entries in response to added records, and performing another expansion after all the base segment entries have been split. A first address generation function is used for entries that have not yet been split, and a second address generation function is used for entries that have been split.

Figure 9:
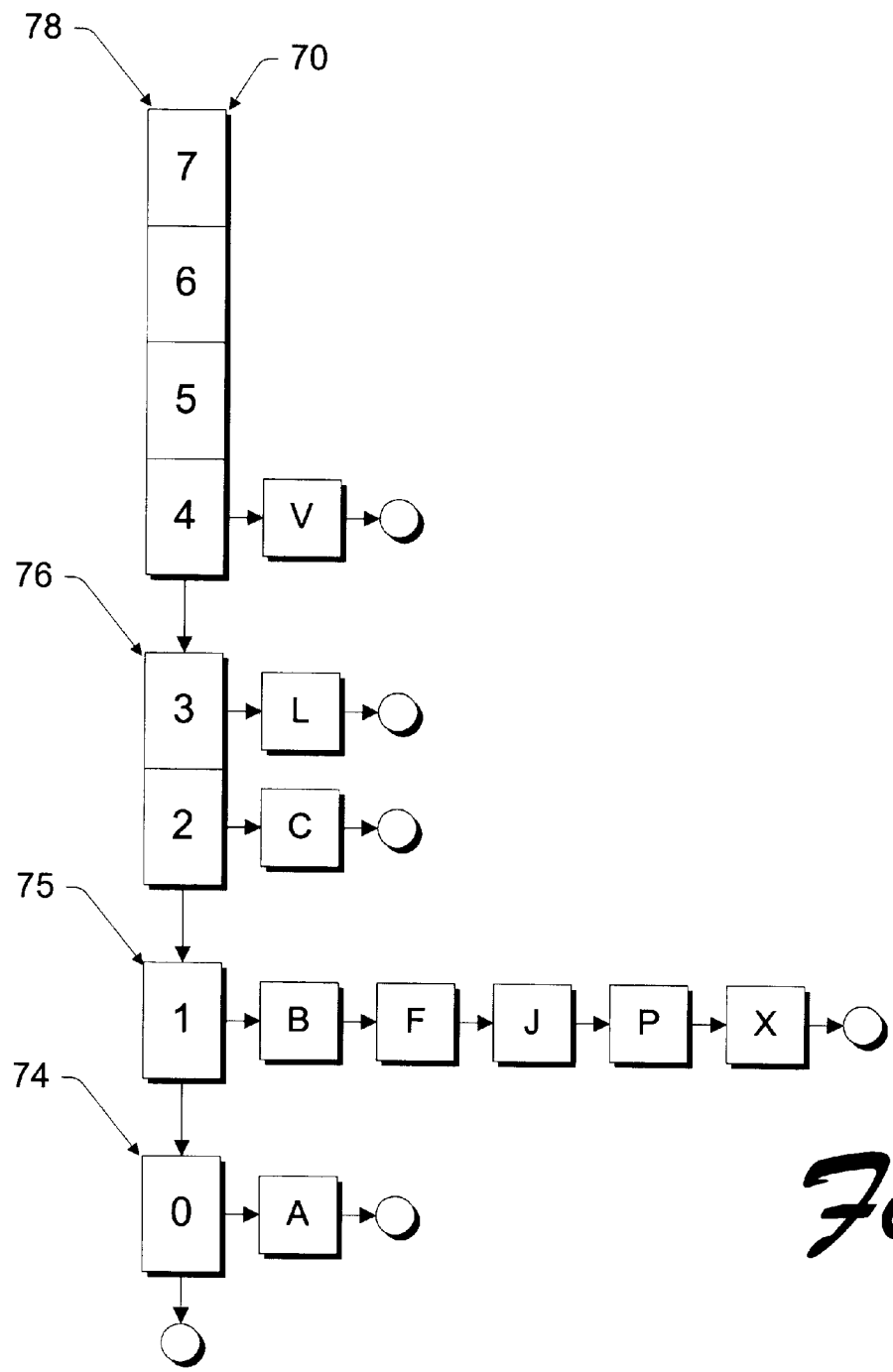
FIG. 9 illustrates partial expansion relative to the hash table of FIG. 8, as performed in accordance with the invention.

As each split occurs in response to an increasing utilization value, one more of the locations in the expansion segment is logically included in the table. For example, consider the insertion of a record with key value "C" into the hash table shown in FIG. 8. Assuming that this key value yields address 2 according to the first address generation function, the new record is assigned to entry 2, which in turn is in the last segment 76. This triggers an expansion, because the utilization value now exceeds two. To expand the hash table, a new segment 78 is allocated and linked into the other segments of the table as shown in FIG. 9. The new segment has four entries, having addresses 4 through 7.

The expansion, alone, does not reduce the utilization value until at least one new entry is logically included in the hash table. This requires splitting at least one of the base segment entries. Generally, the non-split base segment entry having the lowest address is the next one to be split. In this case, entry 0 is split between entries 0 and 4, using the second address generation function, which has characteristics as already discussed. FIG. 9 shows this result, assuming that the second address generation function produces an address of 0 for key value "A" and an address of 4 for key value "V". After the split, the extension value is incremented, in this case to the value 1.

To perform a search in a partially expanded, geometrically segmented hash table such as the one shown in FIG. 9, a first address is generated from the search key using the first address generation function, and compared to an extension value. The extension value, as already explained, indicates how many entries have already been split. If the first address is equal to or greater than the extension value, the first address is used to index the hash table. If the first address is less than the extension value, a second address is generated from the search key using the second address generation function, and the second address is used to index the entries of the search table. In either case, a search for the desired entry is performed by scanning through the list of segments until the segment containing the address is found, at which point the appropriate entry is read and the search continues with the referenced linked list of data records.

Consider an example of a search in the hash table in FIG. 9, in which the search key yields a first address of 1. This address is not less than 1, the current extension value, so the first address is used to locate the desired entry. This address is then compared to the lowest address of the initial segment 78, which is 4. The first address is smaller than the lowest address of the segment, so the system follows the link from the segment 78 to the previous segment 76 and compares the first address to the lowest address of this previous segment, which is 2. The first address is again smaller than the lowest address of segment 76, so the system follows the link to the previous segment 75 and compares the calculated first address to lowest address of this previous segment, which is 1. The first address is not smaller than the lowest address of this segment, so the proper segment has been found, and the appropriate entry within this segment (it happens in this case that there is only one) is followed to the referenced linked list of records.

This process may appear to be inefficient in comparison to looking up an address in a single array, and it is somewhat, but not nearly as much so as it may seem. The mean number of segments that need to be scanned through is a constant equal to N/(N−1), where N is the geometric expansion factor. If the geometric expansion factor is 2, as in the above examples, then the mean number of segments that need to be scanned through is 2. This may seem a bit counterintuitive, so consider that, on average, half of the search addresses will fall within the range of the largest segment, so they will require only scanning this one segment. Another quarter of the addresses will fall within the range of the next-largest segment, so they will require scanning only two segments. There are geometrically fewer addresses that correspond to each of the lower segments, and this series does converge to the value of 2. Also, note that even the worst case is still not terrible: even if 20 expansions have occurred, resulting in a table of size one million, the one in a millionth address of zero requires scanning only 20 segments. This is not trivial, but it is far from the undesirable behavior of copying one million pointers during a single insertion that would have been required by the prior art.

Note that the efficiency of memory usage is greater with this approach than that described in the previous section. At the beginning of an expansion, half of the memory allocated for the hash table is in use. At the end of the expansion, the entire memory allocated for the hash table is in use. Thus, the storage efficiency of the table fluctuates between ½ and 1, which is a marked improvement over the previously described approach. Furthermore, there is no additional reduction in utilization caused by reducing the table size. Since there is only one table (composed of multiple segments) rather than several tables whose usage varies depending upon the logical table size, there will be no additional unused tables consuming storage, as there were in the previously described design.

The invention includes segmented hash tables as described above, which can be efficiently expanded and contracted without imposing significant recalculations at certain thresholds. The invention also includes methodological steps performed in maintaining such hash tables. A method in accordance with the invention includes a step of allocating a plurality of hash table base segments, each of which is positioned in its own contiguous portion of addressable memory. A further step comprises maintaining pointers corresponding to the hash table base segments. Each pointer links its corresponding hash table segment to a previous hash table segment. The segments have addressable entries for referencing data records. A yet further step comprises assigning data records to respective entries of the hash table base segments in accordance with a first address generation function.

The described embodiment of the invention includes a step of maintaining a utilization value or other expansion criteria. Expansions and splits are performed in response to the utilization value. Specifically, a split is performed whenever the utilization value exceeds a predefined value. An expansion is performed after all entries of the most recently allocated table segment have been logically included in the hash table—when the extension value equals the lowest address in the most recently allocated table segment. At this point, a new segment is allocated and the extension value is reset to 0.

More specifically, an expansion comprises a step of allocating a hash table expansion segment in its own contiguous portion of addressable memory, and providing a corresponding pointer to the previously allocated hash table segment (which is now referred to as a base segment, though it was previously an expansion segment). Each successively allocated segment is geometrically larger than the last allocated segment—preferably twice as large as the last allocated segment.

A split is performed by identifying data records assigned to a single entry of one of the hash table base segments, and reassigning the identified data records to a plurality of entries in accordance with a second address generation function. The second address generation function assigns some of the identified data records to the original, single entry. Others of the identified data records are assigned to at least one entry of the hash table expansion segment. The splitting steps are repeated in response to increasing numbers of assigned data records, until all possible splits have been made. More specifically, the splitting steps are repeated whenever the utilization value exceeds its predefined threshold. Another expansion is performed when all the data records have been reassigned—when all the base table entries have been split. After all the base table entries have been split, the expansion segment becomes a base segment and another expansion is performed to allocate a new expansion segment.

When reading, modifying, or inserting a data record, it must be located through one of the table segment entries in accordance with the appropriate address generation function. A step in accordance with the invention comprises identifying a hash table entry corresponding to a particular data record using the first address generation function if the entry identified using the first address generation function has not had its data records split and reassigned, and otherwise identifying the entry corresponding to said particular data record using the second address generation function.

More Efficient Searching and Splitting

A further refinement can be employed to reduce the list splitting operation from a process of scanning through the list and removing scattered records to a process of simply finding an appropriate dividing point in the list and then updating two pointers to effect the split.

As described above, a hash value is an intermediate result of the address generation function. In accordance with this aspect of the invention, the hash value is stored with the data records, and the data records are sorted by their hash values and stored in this sorted order in linked lists of data records.

To convert the hash value to an address, the address generation function normally uses x least significant bits of the hash value, where x increases by one at each expansion (when using a geometric expansion factor of 2). In this embodiment of the invention, however, the address generation function uses the x most significant bits of a data record's hash value for its address.

Expressed in methodological terms, this aspect of the invention includes a step of allocating a hash table having a plurality of entries with corresponding hash table addresses that each have x bits. Further steps include calculating a hash value corresponding to each data record, and calculating an address for each data record based on the x most significant bits of the data record's hash value. The data records are then assigned to hash table entries having matching hash table addresses.

A further step comprises allocating at least one new entry for the hash table in an expansion step, and splitting an existing hash table entry into the new entry. Expansion and splitting steps occur at intervals as already described, preferably using segmented hash tables.

In accordance with this aspect of the invention, splitting comprises first adding a least significant bit, having binary value 0, to the address of the existing hash table entry. A further step comprises assigning an address to the new hash table entry. The address is calculated by inverting the added least significant bit of the address of the existing hash table entry. A yet further step comprises reassigning any data record from the existing hash table entry to the new hash table entry if the $y^{th}$ most significant bit of the hash value of the data record is equal to binary 1, where y=x+1. (The y most significant bit is in bit position x, since the most significant bit is in bit position 0.) Since each linked list of records is sorted, this last step involves simply scanning the linked list until finding a record whose $y^{th}$ most significant bit equals 1, and then breaking the pointer links appropriately: the pointer in the previous record is set to null, and the pointer in the new hash table entry is set to the address of the record whose $y^{th}$ most significant bit is equal to binary 1.

Figure 10:
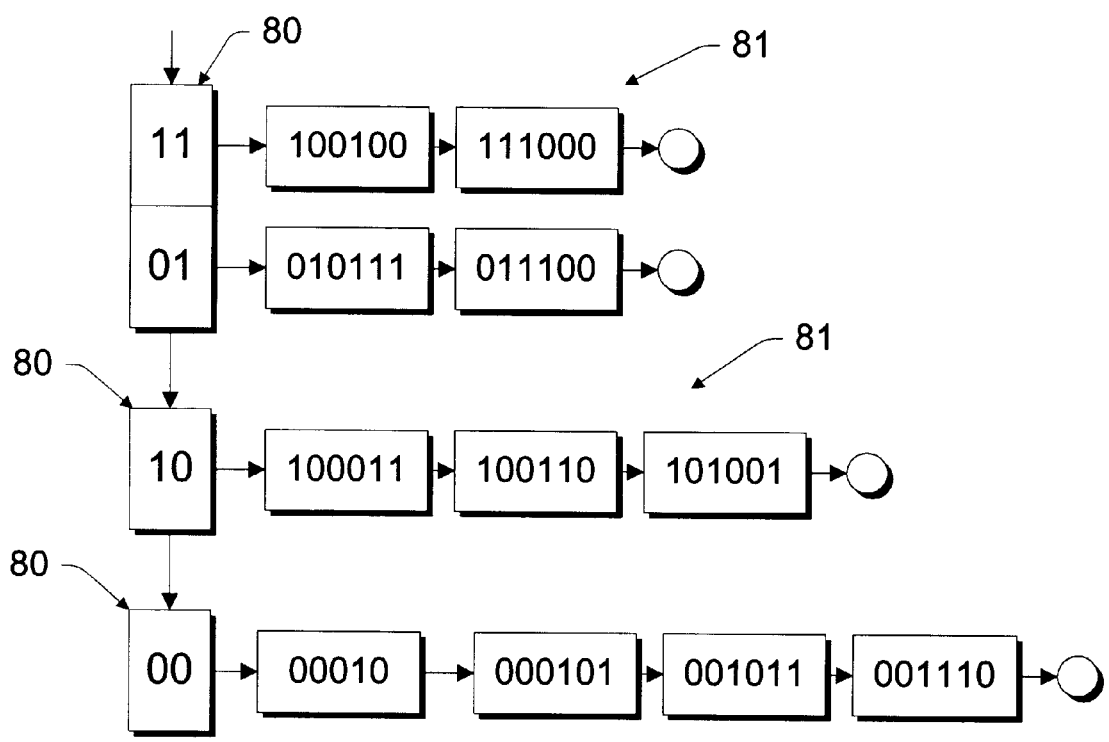
FIGS. 10, 11, and 12 illustrate a method in accordance with the invention that allows efficient segment searching and record splitting.

FIG. 10 shows an example, including a plurality of segments 80 and linked records 81. Each data record is shown with its hash value rather than its key value, and both the table addresses and the hash values are represented in binary. The data records are sorted and linked in their sorted order.

Note that the most recently allocated table segment contains addresses 01 and 11, rather than 10 and 11 as was the case with standard least-significant-bit hashing. Also, the previous segment in the list contains address 10, rather than 01. This is a result of the address assignment scheme already described.

Figure 11:
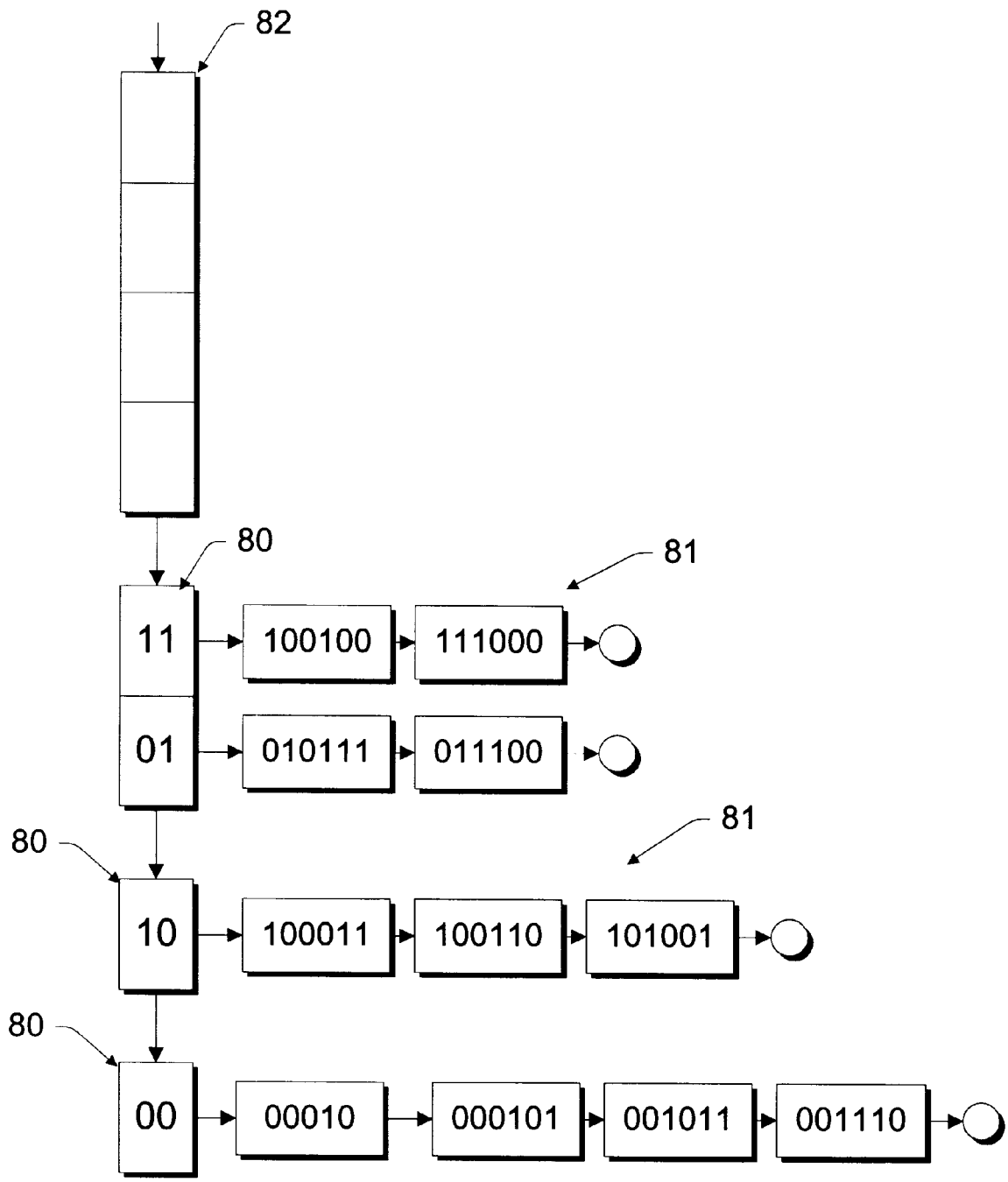

At the beginning of an expansion, the system allocates a geometrically larger segment 82 and links it to the other segments of the table. This is shown in FIG. 11.

Figure 12:
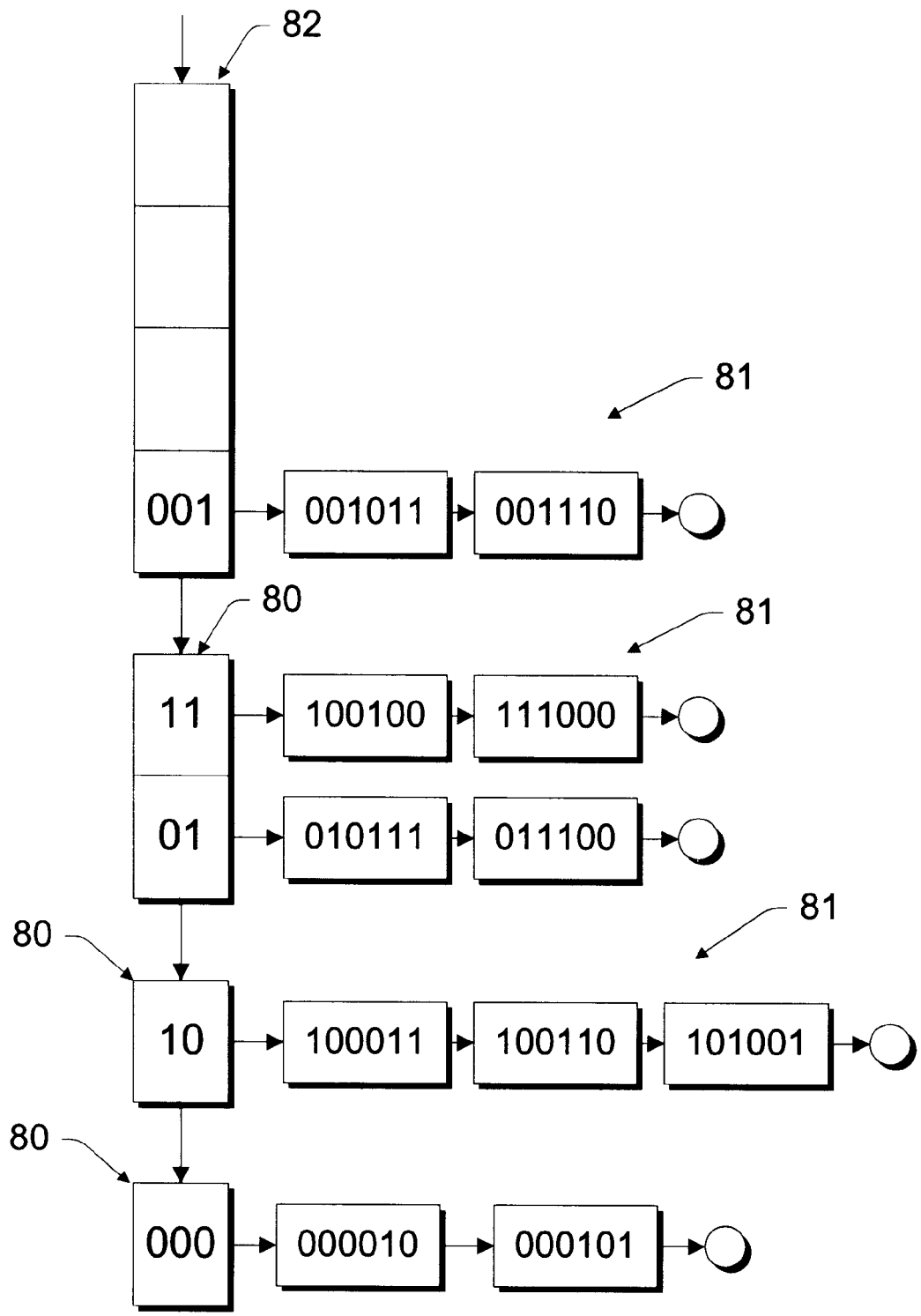

FIG. 12 shows the result of a single split. As before, the non-split entry having the lowest address is the next to be split. In this case, entry 0 is split. To perform the split, entry 0 has another bit, of value 0, added in a least significant position—it now has three bits, equal to 000. An address is now assigned to the next entry in the expansion segment 82, by inverting the least significant bit of the address of entry 0, resulting in an address of 001. The linked list of records referenced by what is now entry 000 is scanned to find the first record whose hash value contains a one in the third most significant bit (bit position 2). Since all records in the list have zeroes in bit positions 0 and 1, and since the records are sorted by their hash values, all records with a one in bit position 2 will form a contiguous chain from some point in the list to the end of the list. These are the records that are reassigned to entry 001; the other records should remain in the current list, assigned to entry 000. Once the first record whose hash value contains a one in bit position 2 is found, the split can be effected by updating the pointer in the table at entry 001 to point to the identified record and updating the pointer of the previous record to point to null. This result is illustrated in FIG. 12.

The next split will occur at entry 01, which—it is interesting to note—is not the next location in the table. The process mirrors that performed above: The address of entry 01 is expanded to equal 010, and another new entry is given an address of 011. The records assigned to entry 010 are scanned and split between the two new entries.

Locating an entry corresponding to a particular data record is performed somewhat differently than in the previous schemes. At a stage of partial expansion, where some entries have not been split, some table entries will have addresses of x bits while others will have addresses of x+1 bits. A first step in locating the correct hash table entry comprises calculating a hash table address for a target data record, based on the x most significant bits of the record's hash value. A subsequent step comprises comparing the calculated address to an extension value that indicates how many of the existing hash table entries have been expanded (as explained in previous sections). If the compared hash table address is less than the extension value, it is recalculated based on the x+1 most significant bits of the record's hash value. Then, the system performs a step of examining the hash table entries in reverse order from which they were logically included in the table (from top to bottom in the illustrations), to find the first hash table entry whose address bits match the corresponding address bits of the calculated address.

Suppose in the example shown in FIG. 12 that the hash value of the target record is 000000. x is equal to 2, so the first two most significant bits are taken as a first address. This address is less than the extension value (which is 1 in the example), so a second address is calculated by taking x+1, or 3, most significant bits of the target record's hash value: 000. Now, the table entries are searched from top to bottom until one is found whose address bits match the corresponding address bits of the calculated second address. In this case, the search will proceed to the last entry, 000.

This process can be streamlined by skipping appropriate segments. If the first address is being used (with x bits), a step is performed of determining the number z of contiguous zero-valued least significant bits in the first address, and then locating the target data record in the hash table segment that was allocated z+1 segments before the most recently allocated hash table segment (the expansion segment). If the second address is being used (having x+1 bits), a step is again performed of determining the number z of contiguous zero-valued least significant bits in the second address. Then, the record is located in the hash table segment that was allocated z segments before the expansion segment.

This search process is described in more detail as follows. A first address is generated from the search key by taking x of the most significant bits of its hash value, where x is determined by the current table size. This first address is compared to the extension value. If the first address is less than the extension value, then a second address is generated from the search key by appending the next-most significant bit of the hash value to the first address; effectively, this is equivalent to using a second address generation function. A bit index is initialized to bit position x+1, and a search for the first address begins with the expansion segment. If the first address is equal to or greater than the extension value, the bit index is initialized to bit position x, and a search begins with the segment preceding the expansion segment.

In either case, the search proceeds by scanning through the segments, decrementing the bit index after each segment, until either the indexed bit of the calculated address equals 1 or the initial segment has been reached. At this point, the segment containing the correct entry has been found, the entry within the segment is determined from the bits to the left of the first one bit in the key value, the appropriate pointer is read from this entry, and the search continues with the referenced linked list of data records.

Search behavior can vary along a couple of dimensions according to the target address. First, consider searching for an address of 000. The bit index is initialized to 2 (to the x+1 or third bit) and the starting segment is the expansion segment (the most recently allocated segment). The value of bit 2 of address 000 is zero, so the bit index is decremented and the previous segment is examined. The value of bit 1 of address 000 is still zero, so the bit index is decremented and the previous segment is examined. The value of bit 0 of address 000 is zero, so the bit index is decremented and the previous segment is examined. This is the final segment, which contains only one entry, so this points to the linked list that is to be searched.

As a second example, consider a search for address 001. The bit index is again initialized to 2 and the starting segment is the expansion segment. The value of bit 2 of address 001 is one, so the proper segment has been found. The value of the bits to the left of the first one bit is 0, so the pointer at offset 0 within the segment points to the list that is to be searched.

As a third example, consider a search address of 10. The bit index is initialized to 1 (the x+1 or second bit) and the starting segment is the one previous to the expansion segment (the most recently allocated base segment). The value of bit 1 of address 10 is zero, so the bit index is decremented and the previous segment is found. The value of bit 0 of address 10 is one, so the proper segment has now been found. The value of the bits to the left of the first one bit is 0, so the pointer at offset 0 within the segment points to the list that is to be searched.

Alternative Pointer Representation

Figure 13:
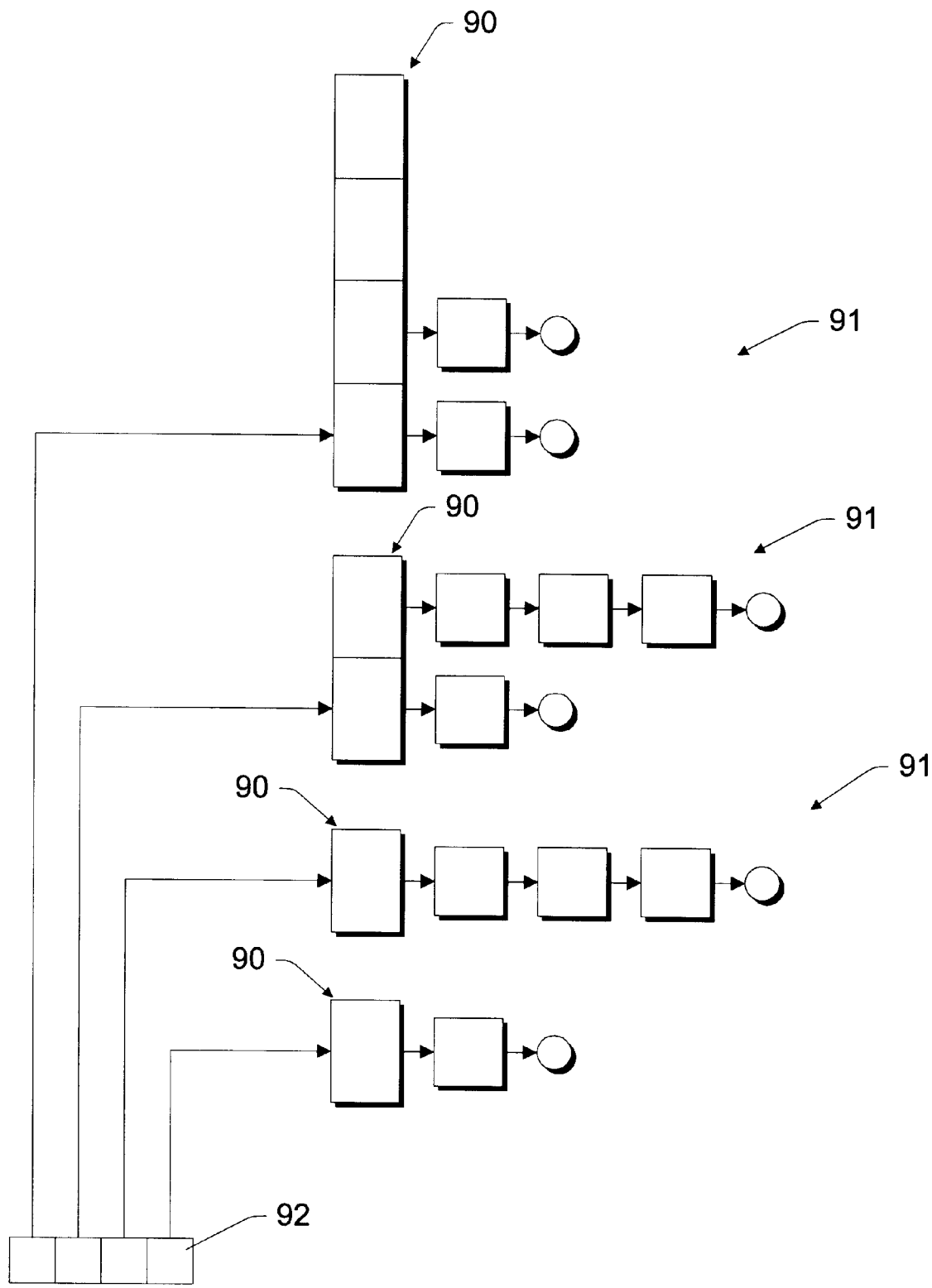
FIG. 13 illustrates a pointer table in accordance with the invention, in conjunction with a segmented hash table.

In the embodiment described immediately above, each search requires scanning through the linked list of segments to determine which segment contains the desired address. However, except for the final segment searched, there is no information in each segment that is needed other than the pointer to the previous segment in the linked list. An alternate representation of this list of segments could avoid the cost of scanning through the list. One such representation involves maintaining a pointer array or table with pointers corresponding to the hash table base segments. Each pointer links its corresponding hash table segment to a previously allocated hash table segment. Once the scan of the bit values of the address determines which segment contains the pointer to the appropriate list, the array can be directly indexed by this value to provide a pointer to the appropriate segment. This is illustrated in FIG. 13, which shows hash table segments 90, data records 91, and a pointer array 92.

Of course, the array must be allocated to some finite size, and if the number of segments needs to grow beyond this number, then a larger array must be allocated and the pointers copied to the new array. Since the size of the array is logarithmic in the size of the hash table, this is not a very expensive operation.

Algorithms

Figure 14:
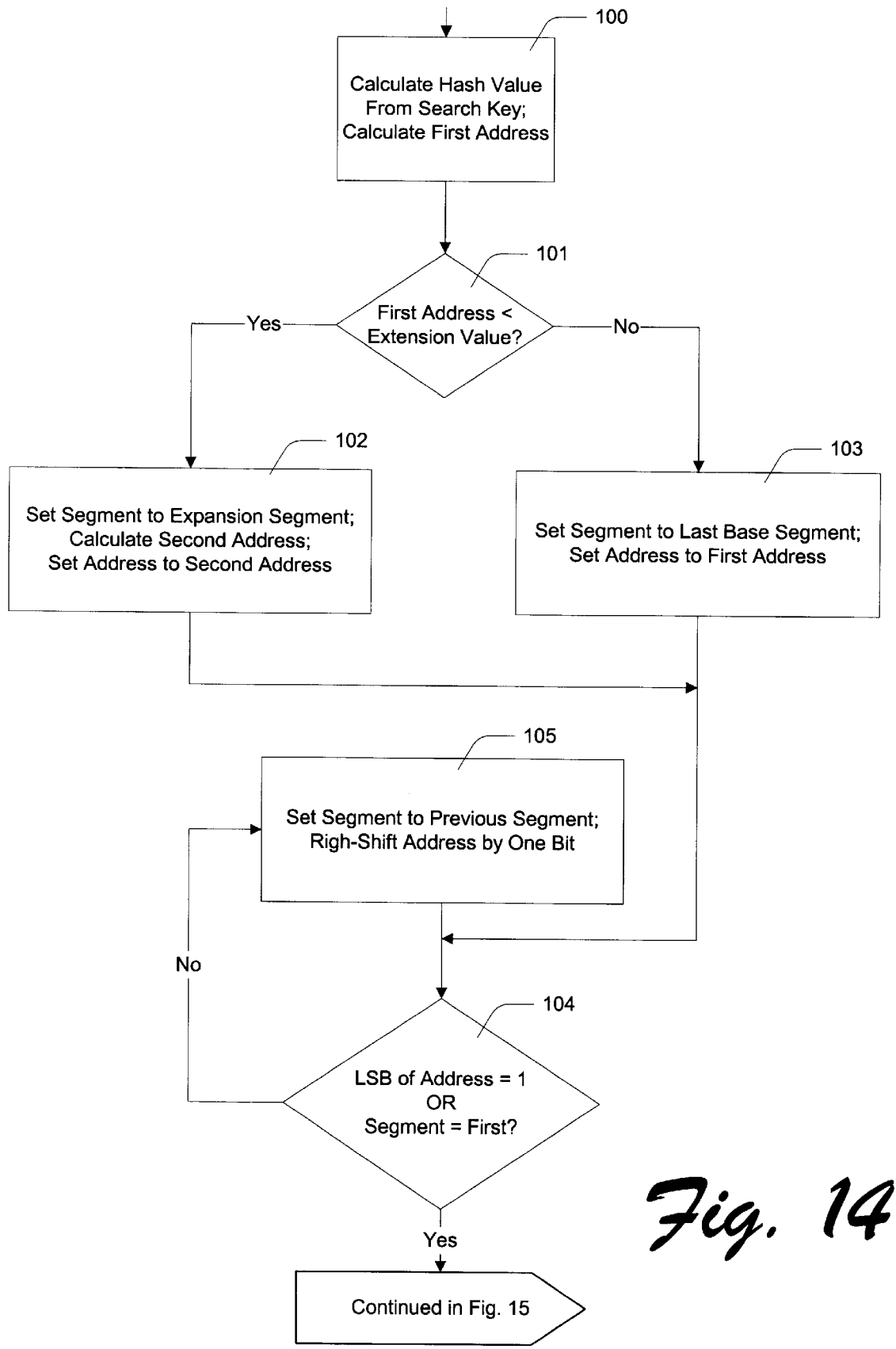
FIGS. 14 and 15 illustrate a find algorithm in accordance with the invention.
Figure 15:
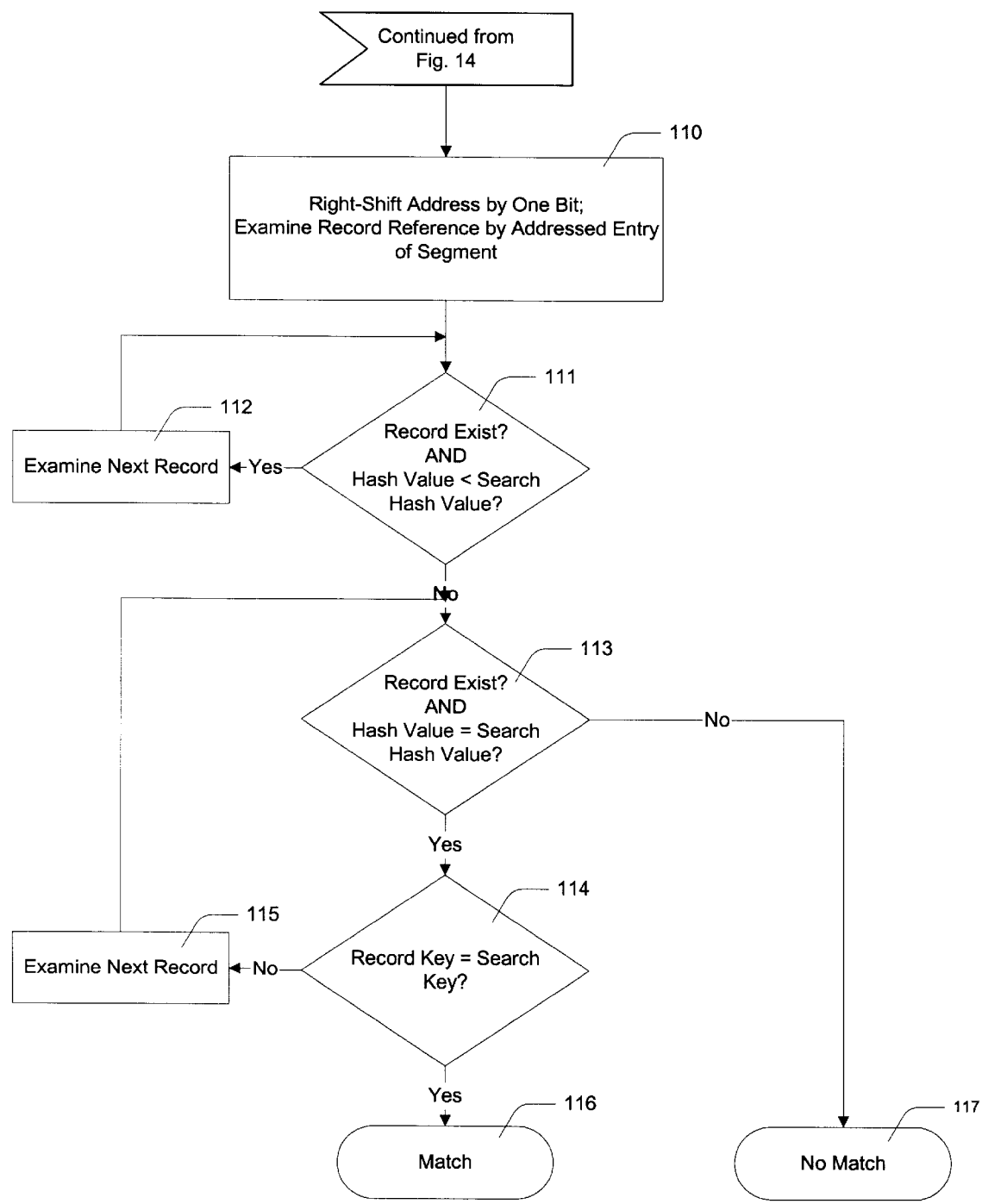

FIGS. 14–18 illustrate detailed routines for implementing segmented hash tables in accordance with the invention. FIGS. 14 and 15 illustrate a routine for finding the location of a given record given the search key for that record. A step 100 in this routine comprises calculating a hash value from the search key, and calculating a first address based on the hash value. Block 101 is a decision regarding whether the calculated first address is less than the extension value. If it is, block 102 is executed which comprises setting the current segment to the expansion segment, calculating a second address that uses an additional bit of the hash value, and setting the current address to the second address. If the calculated first address is not less than the extension value, a block 103 is executed of setting the current segment to the last base segment (the segment preceding the expansion segment) and setting the current address to the first address.

The next step is a decision 104, determining whether the least significant bit of the current address is 1, or whether the current segment is the first segment in the linked list of segments. If either of these conditions is true, execution continues with the steps of FIG. 15. Otherwise, a step 105 is executed and step 104 is repeated. Step 105 comprises decrementing the current segment to the most previous segment, and right shifting the current address by one bit. The test of step 104 is then performed on the next most significant bit of the address (which has been shifted to the least significant bit).

The steps of FIG. 14 locate the segment containing the entry that references the linked record list containing the desired record. FIG. 15 illustrates the steps performed to find the correct table entry and data record, once the correct segment has been located. A step 110 comprises right shifting the current address by one bit, and then examining the record referenced by the remaining bits of the current address. These bits indicate an offset from the lowest address of the current segment, at which the desired hash table entry will be found.

Blocks 111 and 112 represent scanning through the linked list of records until either there are no more records or until the hash value of the current record in the linked list is equal to or greater than the hash value of the record being sought. Blocks 113, 114, and 115 illustrate scanning through the remaining records in the linked list, checking each one to determine if its key matches the search key. If no match is found, execution terminates at block 117, returning the location where a data record such as the sought-for data record should be located (although not present in this case). If a match is found, execution terminates by returning the record in block 116.

Figure 16:
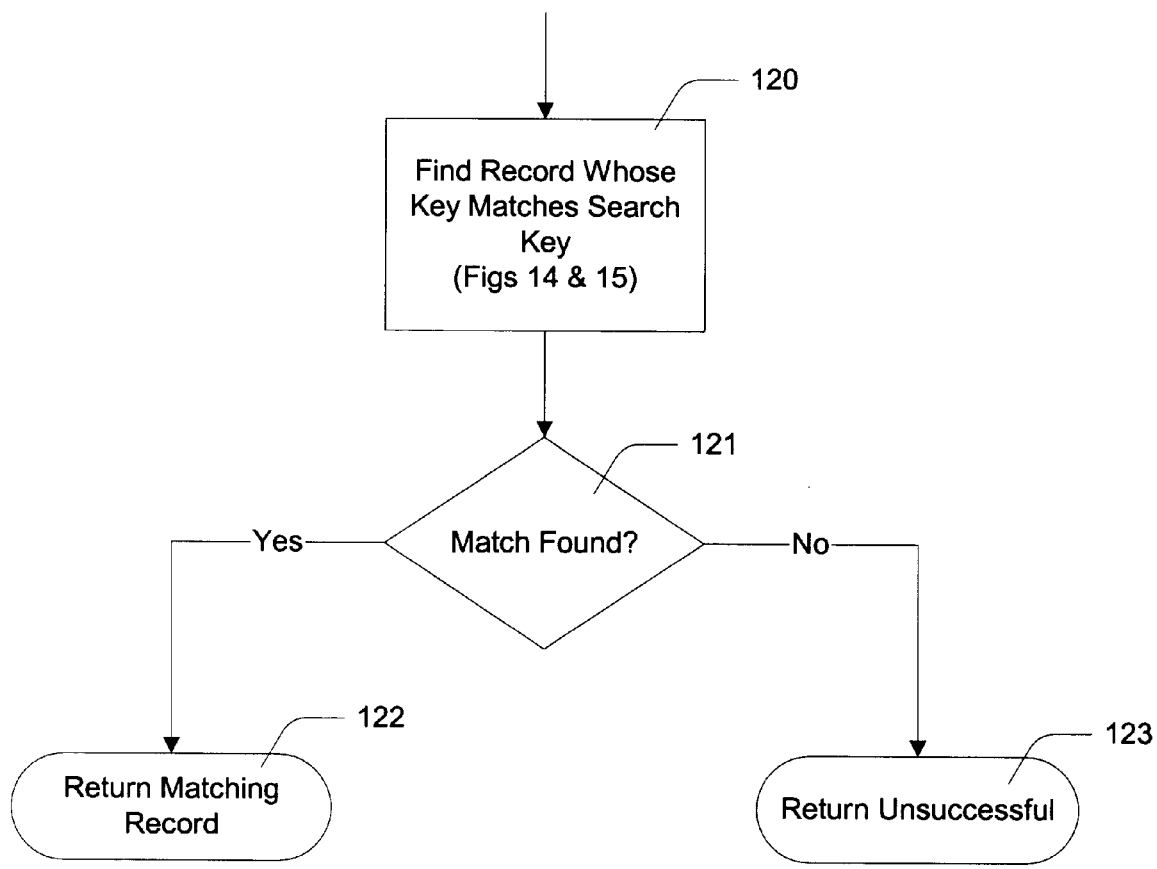
FIG. 16 illustrates a search algorithm in accordance with the invention.

FIG. 16 illustrates a search routine which merely executes the find routine of FIGS. 14 and 15, and returns the record whose key matches the search key, if one is found. If no record with a match key is found, then an indication of an unsuccessful search is returned.

Figure 17:
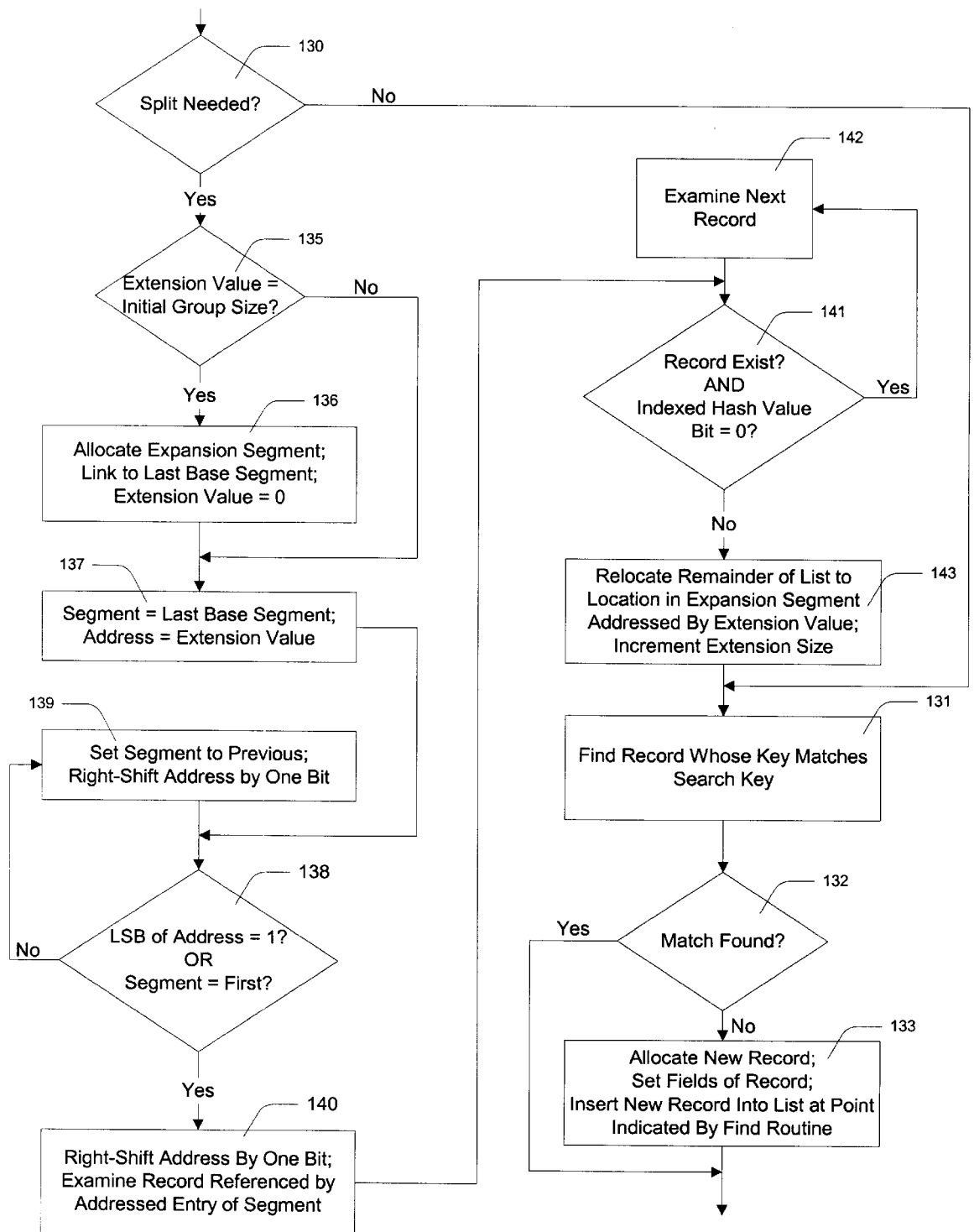
FIG. 17 illustrates an insert algorithm in accordance with the invention.

FIG. 17 illustrates an insert routine, which first determines whether to increase the table size based on some decision criterion such as the ratio of stored records to hash table locations, before proceeding to the insertion proper. This decision is indicated by block 130. If no split is required, execution jumps to block 131 which is simply a call to the find routine described with reference to FIGS. 14 and 15. If an existing record is found having a key that matches the search key, execution of this routine terminates. Otherwise, a step 133 is performed of allocating a new record and inserting it in the linked list at the point indicated by the find routine.

If a split is required as a result of step 130, step 135 determines whether the current extension value equals the number of entries in the current expansion segment. If the result of this test is true, all entries have been split and the expansion segment becomes a base segment. A new expansion segment is allocated in block 136 and linked to the previously allocated segment. The extension value is set to 0.

Step 137 comprises setting the current segment equal to the last base segment (the segment preceding the expansion segment), and the current address is set equal to the extension value. Blocks 138 and 139 represent scanning through the segments, while right-shifting the current address. One segment is skipped every time the least significant bit of the address equals 0 after right shifting. If at any time the least significant bit equals 1 or the first segment has been reached, no more segments are skipped. In block 140, the current address is right-shifted one last time, and the remaining bits are used to locate an entry in the current segment. Blocks 141 and 142 illustrate the process of scanning through the records referenced by the located entry to find the first entry whose hash value has a one in bit position x. Block 143 comprises reassigning the remainder of the list to the new entry in the expansion segment, as addressed by the extension value. The extension value is then incremented. Execution then proceeds with block 131 as already described.

Figure 18:
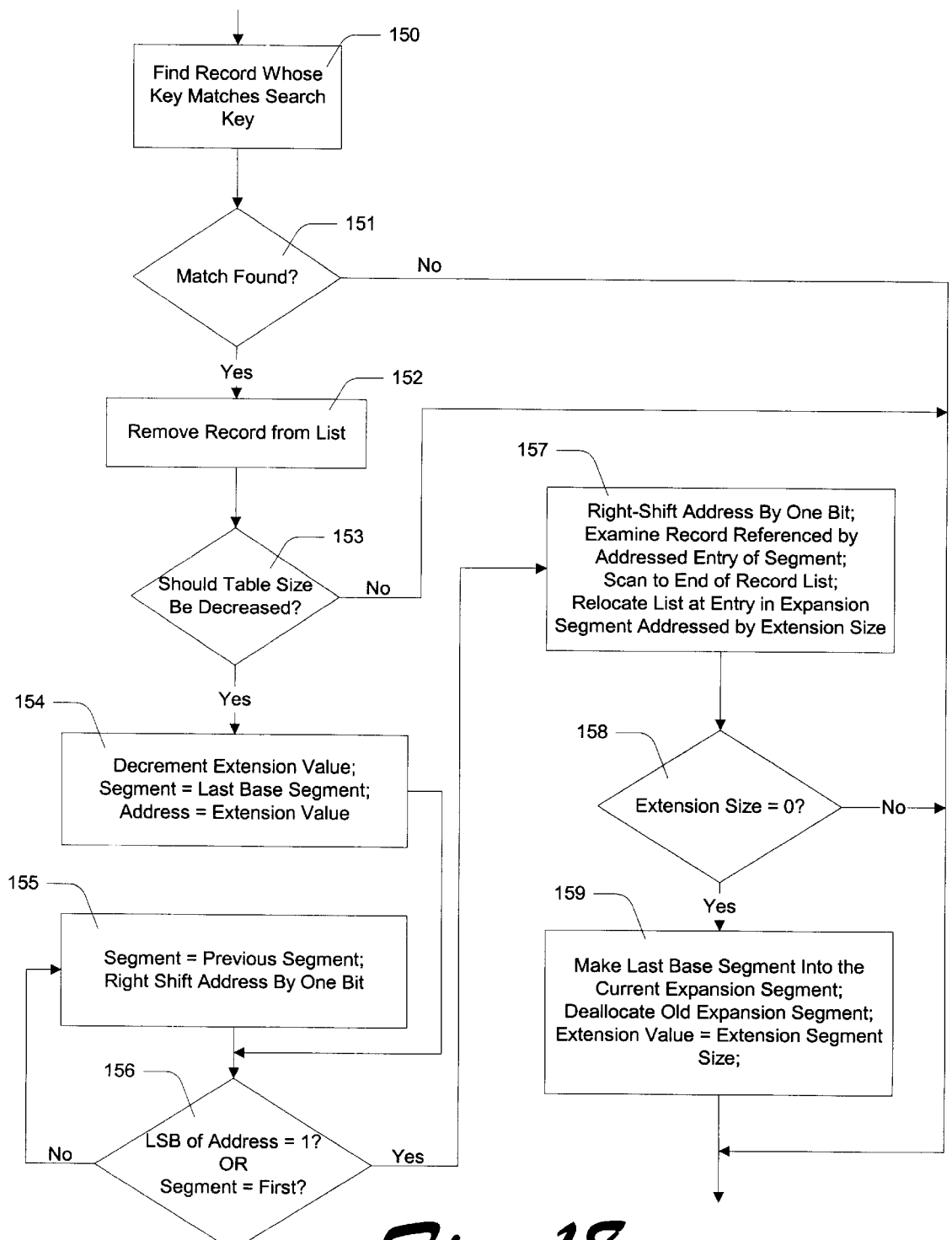
FIG. 18 illustrates a remove algorithm in accordance with the invention.

FIG. 18 illustrates the remove routine which, after performing the removal, determines whether to decrease the table size based on some decision criterion such as the ratio of stored records to hash table locations. This decision possibly incorporates a hysteresis factor to reduce allocation/deallocation chatter. Block 150 calls the routine described with reference to FIGS. 15 and 16. The remove routine is analogous to the insert routine already described.

Conclusion

The different variations of the invention provide efficient techniques for expanding and contracting a hash table. The techniques provide the desirable advantage that mean insertion times remain constant regardless of how many records are referenced by the hash table and regardless of the size of the hash table. In addition, the techniques avoid the requirement of lengthy recalculations at any single insertion. A single insertion at most requires two address calculations, while remaining recalculations are distributed over time as additional records are inserted or removed.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computer-readable addressable memory for storing an internal hash table having entries that reference a plurality of data records, comprising:

a plurality of hash table segments having increasing sizes, each hash table segment being positioned in its own contiguous portion of the addressable memory, the hash table segments having addressable entries that reference data records in the addressable memory;

a plurality of pointers in the addressable memory that link larger hash table segments to smaller hash table segments.

2. A computer-readable addressable memory as recited in claim 1, the plurality of hash table segments comprising an ordered sequence of hash table segments, wherein the hash table segments increase geometrically in size in the ordered sequence.

3. A computer-readable addressable memory as recited in claim 1, further comprising the referenced data records.

4. A computer-readable addressable memory as recited in claim 1, further comprising a pointer table in the memory, the pointer table containing the plurality of pointers.

5. A computer-readable addressable memory as recited in claim 1, wherein:

the plurality of hash table segments comprises an ordered sequence of hash table segments;

the hash table segments increase geometrically in size in the ordered sequence;

each pointer in the plurality of pointers is contained in a respective hash table segment;

the pointer in any particular hash table segment references a previous and smaller hash table segment in the ordered sequence of hash table segments.

6. A method of expanding an existing internal hash table, wherein data records are assigned to respective entries of the existing hash table in accordance with a first address generation function, the method comprising the following steps:

allocating an expanded internal hash table in addition to the existing hash table, the expanded hash table having entries corresponding to the entries of the existing hash table and a plurality of additional entries;

splitting less than all of the entries of the existing hash table between entries of the expanded hash table in accordance with a second address generation function;

subsequently identifying an entry in the existing hash table corresponding to a particular data record using the first address generation function if said entry has not been split, and otherwise identifying an entry in the expanded hash table corresponding to said particular data record using the second address generation function.

7. A method as recited in claim 6, wherein the splitting step is performed with respect to single entries as required to maintain a target ratio of data records to table entries.

8. A method as recited in claim 6, further comprising a step of repeating the splitting step as additional data records are assigned.

9. A method as recited in claim 6, further comprising a step of repeating the splitting step as additional data records are assigned to maintain a target ratio of data records to table entries.

10. A method as recited in claim 6, wherein the expanded hash table has twice as many entries as the existing hash table.

11. A method as recited in claim 6, wherein the allocating step is repeated after all the entries of the existing hash table have been split, wherein each allocated hash table is geometrically larger than the previously allocated hash table.

12. A method as recited in claim 6, further comprising a step of deallocating the existing hash table after all the entries of the existing hash table have been split.

13. A method as recited in claim 6, further comprising a step of maintaining an extension value indicating which entries of the existing hash table have had their data records split.

14. A method of maintaining a variably sized internal hash table in dynamically allocated primary memory, comprising the following steps:

allocating a plurality of hash table base segments, each hash table base segment being positioned in its own contiguous portion of the primary memory;

maintaining pointers corresponding to the hash table base segments, each pointer linking its corresponding hash table segment to a previous hash table segment, the linked hash table segments having addressable entries for referencing data records;

assigning data records to respective entries of the hash table base segments in accordance with a first address generation function;

allocating a hash table expansion segment in its own contiguous portion of the primary memory and providing a corresponding pointer to a previously allocated hash table base segment;

splitting a single entry of one of the hash table base segments between a plurality of entries in accordance with a second address generation function, the second address generation function assigning some of the identified data records to said single entry and others of the identified data records to at least one entry of the hash table expansion segment;

subsequently identifying a hash table entry corresponding to a particular data record using the first address generation function if the entry identified using the first address generation function has not been split, and otherwise identifying the entry corresponding to said particular data record using the second address generation function.

15. A method as recited in claim 14, wherein the splitting step is repeated in response to increasing numbers of assigned data records.

16. A method as recited in claim 14, wherein the splitting step is repeated in response to a hash table efficiency criterion.

17. A method as recited in claim 14, wherein the hash table expansion segment becomes a hash table base segment after all possible splits have occurred.

18. A method as recited in claim 14, wherein the hash table expansion segment becomes a hash table base segment after all possible splits have occurred, the method comprising a further step of allocating another hash table expansion segment.

19. A method as recited in claim 14, wherein the pointers are maintained in the corresponding hash table segments.

20. A method as recited in claim 14, wherein the pointers are maintained in a pointer array apart from the hash table segments.

21. A method as recited in claim 14, wherein the hash table expansion segment becomes a hash table base segment after all possible splits have occurred, the method comprising a further step of allocating another hash table expansion segment, wherein each successively allocated hash table segment is geometrically larger than the previously allocated hash table segment.

22. A method as recited in claim 14, wherein the hash table expansion segment becomes a hash table base segment after all possible splits have occurred, the method comprising a further step of allocating another hash table expansion segment, wherein each successively allocated hash table segment twice as large as the previously allocated hash table segment.

23. A method as recited in claim 14, wherein:
the data records assigned to a particular hash table segment entry are organized as a linked list;
the splitting step comprises splitting the linked list between two or more entries of different hash table segments.

24. A computer-readable storage medium having instructions that are executable by a computer to perform steps as recited in claim 14.

25. A computer that is programmed to perform steps as recited in claim 14.

26. A method of utilizing a variably sized internal hash table in dynamically allocated primary memory to index data records, comprising the following steps:

allocating a hash table having a plurality of entries with corresponding hash table addresses that each have x bits;

calculating a hash value corresponding to each data record;

calculating a hash table address for each data record based on the x most significant bits of the data record's hash value;

assigning data records to hash table entries having matching hash table addresses;

allocating at least one new entry for the hash table;

splitting an existing hash table entry into the new entry as follows:

adding a least significant bit having binary value 0 to the address of the existing hash table entry;

assigning an address to the new hash table entry, wherein said address is calculated by inverting the added least significant bit of the address of the existing hash table entry;

reassigning any data record from the existing hash table entry to the new hash table entry if the $y^{th}$ most significant bit of the hash value of the data record is equal to binary 1, wherein y=x+1.

27. A method as recited in claim 26, further comprising the following additional steps:

storing the hash values of the data records with the data records;

sorting the data records assigned to a particular hash table entry by their hash values and storing the data records as linked lists in their sorted orders;

wherein the reassigning step comprises breaking the linked list at the first data record whose $y^{th}$ most significant bit is equal to 1.

28. A method as recited in claim 26, wherein the splitting step is repeated in response to added data records.

29. A method as recited in claim 26, comprising the following additional steps:

calculating a hash table address for a target data record based on the x most significant bits of the data record's hash value;

comparing the hash table address of the target data record to an extension value that indicates how many of the existing hash table entries have been expanded;

if the compared hash table address is less than the extension value, recalculating the hash table address for the target data record based on the x+1 most significant bits of the data record's hash values;

examining the hash table entries in reverse order from which they were allocated for the first hash table entry whose address bits match the corresponding address bits of the calculated target data record's hash table address.

30. A method as recited in claim 26, comprising the following additional step:

allocating the hash table as a sequence of hash table segments that increase in size by a factor of two as they are newly allocated, each hash table segment being positioned in its own contiguous portion of addressable memory, wherein the step of allocating at least one new entry comprises allocating a new hash table segment, new hash table entries being located in the most recently allocated hash table segment.

31. A method as recited in claim 26, comprising the following additional steps:

allocating the hash table as a sequence of hash table segments that increase in size by a factor of two as they are newly allocated, each hash table segment being positioned in its own contiguous portion of addressable memory, wherein the step of allocating at least one new entry comprises allocating a new hash table segment, new hash table entries being located in the most recently allocated hash table segment;

maintaining pointers corresponding to the hash table base segments, each pointer linking its corresponding hash table segment to a previously allocated hash table segment.

32. A computer-readable storage medium having instructions that are executable by a computer to perform steps as recited in claim 26.

33. A computer that is programmed to perform steps as recited in claim 26.

34. A method as recited in claim 26, comprising the following additional steps:

allocating the hash table as a sequence of hash table segments that increase in size by a factor of two as they are newly allocated, each hash table segment being positioned in its own contiguous portion of addressable memory, wherein the step of allocating at least one new entry comprises allocating a new hash table segment, new hash table entries being located in the most recently allocated hash table segment;

calculating a hash table address for a target data record based on the x most significant bits of the data record's hash value;

comparing the hash table address of the target data record to an extension value that indicates how many of the existing hash table entries have been expanded;

if the compared hash table address is equal to or greater than the extension value, determining a number z of contiguous zero-valued least significant bits in the compared hash table address, and locating the target data record in the hash table segment that was allocated z+1 segments before the most recently allocated hash table segment;

if the compared hash table address is less than the extension value, recalculating the hash table address for the target data record based on the x+1 most significant bits of the data record's hash values, determining a number z of zero-valued least significant bits in the re-calculated hash table address, and locating the target data record in the hash table segment that was allocated z segments before the most recently allocated hash table segment.

35. A method as recited in claim 34, comprising the following additional step:

maintaining pointers corresponding to the hash table base segments, each pointer linking its corresponding hash table segment to a previously allocated hash table segment.

36. A method as recited in claim 34, comprising the following additional step:

maintaining a pointer table with pointers corresponding to the hash table base segments, each pointer linking its corresponding hash table segment to a previously allocated hash table segment.

37. A method as recited in claim 34, comprising the following additional step:

maintaining pointers with the hash table segments, each pointer linking its corresponding hash table segment to a previously allocated hash table segment.

38. A computer-readable storage medium having instructions that are executable by a computer to perform steps as recited in claim 34.

39. A computer that is programmed to perform steps as recited in claim 34.

40. A computer-readable storage medium having instructions that are executable by a computer to perform steps comprising:

allocating a hash table as a sequence of hash table base segments that increase in size by a factor of two as they are newly allocated, each hash table segment being positioned in its own contiguous portion of addressable memory, each hash table having a plurality of entries with corresponding hash table addresses that each have x bits;

calculating a hash value corresponding to each data record;

calculating a hash table address for each data record based on the x most significant bits of the data record's hash value;

assigning data records to hash table entries having matching hash table addresses;

allocating a hash table expansion segment as the most recently allocated hash table segment;

splitting an existing entry in one of the hash table base segments into a new entry in the hash table expansion segment as follows:
adding a least significant bit having binary value 0 to the address of the existing hash table entry;
assigning an address to the new hash table entry, wherein said address is calculated by inverting the added least significant bit of the address of the existing hash table entry;
reassigning any data record from the existing hash table entry to the new hash table entry if the $y^{th}$ most significant bit of the hash value of the data record is equal to binary 1, wherein $y=x+1$;
calculating a hash table address for a target data record based on the x most significant bits of the data record's hash value;
comparing the hash table address of the target data record to an extension value that indicates how many of the existing hash table entries have been expanded;
if the compared hash table address is equal to or greater than the extension value, determining a number z of contiguous zero-valued least significant bits in the compared hash table address, and locating the target data record in the hash table segment that was allocated z+1 segments before the most recently allocated hash table segment;
if the compared hash table address is less than the extension value, recalculating the hash table address for the target data record based on the x+1 most significant bits of the data record's hash values, determining a number z of zero-valued least significant bits in the re-calculated hash table address, and locating the target data record in the hash table segment that was allocated z segments before the most recently allocated hash table segment.

41. A computer-readable storage medium as recited in claim 40, having further instructions for performing additional steps comprising:
maintaining pointers corresponding to the hash table base segments, each pointer linking its corresponding hash table segment to a previously allocated hash table segment.

42. A computer-readable storage medium as recited in claim 40, having further instructions for performing an additional step comprising:
maintaining a pointer table with pointers corresponding to the hash table base segments, each pointer linking its corresponding hash table segment to a previously allocated hash table segment.

43. A computer-readable storage medium as recited in claim 40, having further instructions for performing an additional step comprising:
maintaining pointers with the hash table segments, each pointer linking its corresponding hash table segment to a previously allocated hash table segment.

* * * * *